United States Patent
Chen et al.

(10) Patent No.: US 10,037,278 B2
(45) Date of Patent: Jul. 31, 2018

(54) OPERATION PROCESSING DEVICE HAVING HIERARCHICAL CACHE MEMORY AND METHOD FOR CONTROLLING OPERATION PROCESSING DEVICE HAVING HIERARCHICAL CACHE MEMORY

(71) Applicant: FUJITSU LIMITED, Kawasaki-shi, Kanagawa (JP)

(72) Inventors: Junlu Chen, Kawasaki (JP); Toru Hikichi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 15/207,974

(22) Filed: Jul. 12, 2016

(65) Prior Publication Data

US 2017/0052890 A1    Feb. 23, 2017

(30) Foreign Application Priority Data

Aug. 17, 2015 (JP) .................................. 2015-160475

(51) Int. Cl.
   *G06F 12/084* (2016.01)
   *G06F 12/0808* (2016.01)
   (Continued)

(52) U.S. Cl.
   CPC ........ *G06F 12/084* (2013.01); *G06F 12/0808* (2013.01); *G06F 12/082* (2013.01);
   (Continued)

(58) Field of Classification Search
   CPC ............. G06F 12/0808; G06F 12/0811; G06F 12/0815; G06F 12/084; G06F 12/0842;
   (Continued)

(56) References Cited

U.S. PATENT DOCUMENTS 5,694,573 A * 12/1997 Cheong ............... G06F 12/0811
                                                    711/122
7,194,597 B2 * 3/2007 Willis ................. G06F 12/1027
                                                    711/147

(Continued)

FOREIGN PATENT DOCUMENTS

JP    2004-199677    7/2004

*Primary Examiner* — Reginald Glenwood Bragdon
*Assistant Examiner* — Aaron D Ho
(74) *Attorney, Agent, or Firm* — Staas & Halsey LLP

(57) ABSTRACT

An operation processing device including: processors, first cache corresponding to each processors; and a second cache shared by the processors, wherein the second cache includes; a data retaining unit that retains data, a first information retaining unit that retains first management information of data in the first cache, a second information retaining unit that retains second management information of data in the data retaining unit, a classifying unit that classifies a request performed by referencing the first management information and not referencing the second management information as a first type request and classifies a request performed by referencing the second management information as a second type request, a second processing unit that references the second management information to perform the second type request, and a first processing unit that references the first management information and does not reference the second management information to perform the first type request.

5 Claims, 26 Drawing Sheets

(51) Int. Cl.
G06F 12/0811 (2016.01)
G06F 12/128 (2016.01)
G06F 12/0817 (2016.01)

(52) U.S. Cl.
CPC ........ *G06F 12/0811* (2013.01); *G06F 12/128* (2013.01); *G06F 2212/62* (2013.01)

(58) Field of Classification Search
CPC ......... G06F 2212/60; G06F 2212/6032; G06F 2212/608; G06F 2212/6082; G06F 2212/62; G06F 2212/622
USPC ........................................................ 711/119
See application file for complete search history.

(56) References Cited

U.S. PATENT DOCUMENTS

| | | | |
|---|---|---|---|
| 2004/0117558 A1 | 6/2004 | Krick et al. | |
| 2009/0307434 A1* | 12/2009 | Sivaramakrishnan | G06F 12/0607 711/147 |
| 2014/0289469 A1* | 9/2014 | Ishii ................... | G06F 12/1045 711/119 |
| 2016/0210231 A1* | 7/2016 | Huang ................ | G06F 12/0811 |

* cited by examiner

FIG. 11

| PROCESS REQUEST | PROCESS CONTENT | REMARK |
|---|---|---|
| BPMO | INVALIDATE DATA OF L1, LL AND OUTPUT DATA FROM L1 | SUBORDINATE FLOW TO MORP, MOCO |
| BISR-L(L1-RPL) | PROCESS RELATED TO COMPLETION OF L1 REPLACEMENT (NO WRITE-BACK FROM L1 TO LL) | SUBORDINATE FLOW TO READ, MVIN |
| BISR-L(L1-CPB) | INVALIDATE DATA OF L1 ALONG WITH INTER-L1 TRANSFER (NO WRITE-BACK FROM L1 TO LL) | SUBORDINATE FLOW TO READ |
| BISR-R | INVALIDATE DATA OF L1, LL | — |
| WRBK(L1-RPL) | PROCESS RELATED TO COMPLETION OF L1 REPLACEMENT (WRITE-BACK FROM L1 TO LL) | SUBORDINATE FLOW TO READ, MVIN |
| WRBK(L1-CPB) | INVALIDATE DATA OF L1 ALONG WITH INTER-L1 TRANSFER (WRITE-BACK FROM L1 TO LL) | SUBORDINATE FLOW TO READ |
| MOSR | INVALIDATE DATA OF L1, LL AND OUTPUT DATA OF LL | SUBORDINATE FLOW TO MORP, MOCO |
| MORP | REPLACE DATA OF LL WHEN LL CACHE MISS OCCURS | SUBORDINATE FLOW TO READ |
| MVIN | REGISTER DATA IN LL AND SEND DATA IN RESPONSE TO L1 WHEN LL CACHE MISS OCCURS | SUBORDINATE FLOW TO READ |
| MOCO | PROCESS EXTERNAL SNOOP INSTRUCTION | — |
| READ | SEND DATA IN RESPONSE TO L1 WHEN LL CACHE HIT OCCURS REQUEST READ TO MEMORY WHEN LL CACHE MISS OCCURS | NEW REQUESTED FLOW |

FIG. 12

| PROCESS REQUEST | PID[3:0] | OPCD[1:0] | TYPE | REMARK |
|---|---|---|---|---|
| READ(S) | 1101 | 01 | SECOND TYPE PROCESS REQUEST | INPUT INTO MAIN PIPELINE CONTROL UNIT |
| READ(E) | 1101 | 11 | SECOND TYPE PROCESS REQUEST | INPUT INTO MAIN PIPELINE CONTROL UNIT |
| MORP | 1000 | 00 | SECOND TYPE PROCESS REQUEST | INPUT INTO MAIN PIPELINE CONTROL UNIT |
| MOCO | 1010 | 00 | SECOND TYPE PROCESS REQUEST | INPUT INTO MAIN PIPELINE CONTROL UNIT |
| MVIN(S-DT) | 1001 | 01 | SECOND TYPE PROCESS REQUEST | INPUT INTO MAIN PIPELINE CONTROL UNIT |
| MVIN(E-DT) | 1001 | 11 | SECOND TYPE PROCESS REQUEST | INPUT INTO MAIN PIPELINE CONTROL UNIT |
| MVIN(E-BS) | 1001 | 10 | SECOND TYPE PROCESS REQUEST | INPUT INTO MAIN PIPELINE CONTROL UNIT |
| BISR-L(L1-RPL) | 0010 | 01 | FIRST TYPE PROCESS REQUEST | INPUT INTO SUB-PIPELINE CONTROL UNIT |
| BISR-L(L1-CPB) | 0010 | 10 | FIRST TYPE PROCESS REQUEST | INPUT INTO SUB-PIPELINE CONTROL UNIT |
| BISR-R | 0010 | 11 | SECOND TYPE PROCESS REQUEST | INPUT INTO MAIN PIPELINE CONTROL UNIT |
| WRBK(L1-RPL) | 0100 | 01 | SECOND TYPE PROCESS REQUEST | INPUT INTO MAIN PIPELINE CONTROL UNIT |
| WRBK(L1-CPB) | 0100 | 10 | SECOND TYPE PROCESS REQUEST | INPUT INTO MAIN PIPELINE CONTROL UNIT |
| BPMO | 0001 | 00 | SECOND TYPE PROCESS REQUEST | INPUT INTO MAIN PIPELINE CONTROL UNIT |
| MOSR | 0101 | 00 | SECOND TYPE PROCESS REQUEST | INPUT INTO MAIN PIPELINE CONTROL UNIT |

FIG. 13

| PROCESS REQUEST | REFERENCE | | | UPDATE | | | DMEM (R/W) | INSTRUCTION IRPL | INSTRUCTION ISNP | DATA RESPONSE | EXTERNAL REQUEST | SUBSEQUENT (SUBORDINATE) FLOW |
|---|---|---|---|---|---|---|---|---|---|---|---|---|
| | TAGLL | REQUESTER TAGL1c | OTHER TAGL1c | TAGLL | TAGL1c | LRULLc | | | | | | |
| READ(S/E) | — | — | — | — | — | — | — | — | — | — | fetch | MORP,MVIN |
| READ(E) | S | I/S | — | — | — | — | — | — | — | — | fetch | MORP,MVIN |
| READ(E) | S | I/S | S | — | — | — | — | — | SEND | — | fetch | MORP,MVIN,BISR-L(L1-CPB) and the like* |
| READ(S) | S | — | I/S | — | S | UPDATE | R | SEND | — | S | — | BISR-L(L1-RPL), WRBK(L1-RPL) |
| READ(S) | E/M | — | — | — | E | UPDATE | R | SEND | — | E | — | BISR-L(L1-RPL), WRBK(L1-RPL) |
| READ(S) | E/M | — | S | — | S | UPDATE | R | SEND | — | S | — | BISR-L(L1-RPL), WRBK(L1-RPL) |
| READ(S) | E/M | — | E | — | — | — | — | — | SEND | E | — | BISR-L(L1-CPB), WRBK(L1-CPB) |
| READ(E) | E/M | — | — | — | E | UPDATE | R | SEND | — | — | — | BISR-L(L1-RPL), WRBK(L1-RPL) |
| READ(E) | E/M | — | S/E | — | — | — | — | — | SEND | — | — | BISR-L(L1-CPB), WRBK(L1-CPB) |
| READ(E) | E/M | S | S | — | — | UPDATE | — | — | — | E** | — | BISR-L(L1-RPL), WRBK(L1-RPL) |
| READ(E) | E/M | S | S | — | — | — | — | — | — | — | — | BISR-L(L1-CPB), WRBK(L1-CPB) |
| MORP,MOCO | I/S/E | — | — | — | — | — | — | — | — | — | — | — |
| MORP,MOCO | M | — | — | — | — | — | R | — | — | — | store | BISR-R, BPMO, MOSR |
| MORP,MOCO | S/E/M | — | S/E | — | — | — | — | — | SEND | — | — | BISR-R, BPMO, MOSR |
| MVIN(S-DT) | — | — | — | S | S | UPDATE | W | SEND | — | S | — | BISR-L(L1-RPL), WRBK(L1-RPL) |
| MVIN(E-DT) | — | — | — | E | E | UPDATE | W | SEND | — | E | — | BISR-L(L1-RPL), WRBK(L1-RPL) |
| MVIN(E-BS) | S | — | — | E | E | UPDATE | — | — | — | E | — | BISR-L(L1-RPL), WRBK(L1-RPL) |
| MVIN(E-BS) | S | S | — | M | E | UPDATE | — | — | — | E** | — | BISR-L(L1-RPL), WRBK(L1-RPL) |
| BISR-R | S/E | — | S/E | — | — | — | — | — | — | — | — | — |
| WRBK(L1-RPL) | E/M | E | — | M | —*** | — | W | — | — | — | — | — |
| WRBK(L1-CPB) | E/M | — | E | M | — | — | W | — | — | — | — | REINPUT READ |
| BPMO | E/M | E | — | — | — | — | W | — | — | — | store | — |
| MOSR | E/M | S/E | — | — | — | — | R | — | — | — | store | — |

*: MORP, MVIN, BISR-L(L1-CPB), WRBK(L1-CPB)  
**: RESPONSE WITHOUT DATA  
***: UPDATED BY PROCESS BASED ON PRECEDING PROCESS REQUEST

FIG. 14

| PROCESS REQUEST | REFERENCE | | | UPDATE | | | DMEM (R/W) | INSTRUCTION IRPL | INSTRUCTION ISNP | DATA RESPONSE | EXTERNAL REQUEST | SUBSEQUENT (SUBORDINATE) FLOW |
|---|---|---|---|---|---|---|---|---|---|---|---|---|
| | TAGLL* | REQUESTER TAGL1c | OTHER TAGL1c | TAGLL | TAGL1c | LRUL1c | | | | | | |
| BISR-L(L1-RPL) | (S/E/M) | S/E | — | — | —** | — | — | — | — | — | — | — |
| BISR-L(L1-CPB) | (S/E/M) | — | S/E | — | I | — | — | — | — | — | — | REINPUT READ |

\*: NOT REQUIRED TO BE REFERENCED
\*\*: UPDATED BY PROCESS BASED ON PRECEDING PROCESS REQUEST

OPERATION PROCESSING DEVICE HAVING HIERARCHICAL CACHE MEMORY AND METHOD FOR CONTROLLING OPERATION PROCESSING DEVICE HAVING HIERARCHICAL CACHE MEMORY

CROSS-REFERENCE TO RELATED APPLICATION

This application is based upon and claims the benefit of priority of the prior Japanese Patent Application No. 2015-160475, filed on Aug. 17, 2015, the entire contents of which are incorporated herein by reference.

FIELD

The embodiments discussed herein are related to an operation processing device and a method for controlling the operation processing device.

BACKGROUND

An operation processing device such as a central processing unit (CPU) includes a cache memory that is accessible at a higher speed than a main memory device (for example, refer to Japanese Laid-open Patent Publication No. 2004-199677). The cache memory is provided between a processor core such as a CPU core, an operation processing unit, and the main memory device and retains a part of data stored in the main memory device.

The operation processing device, for example, in a case where the cache memory has a hierarchical structure, includes a level two cache memory and a level one cache memory that is accessible at a higher speed than the level two cache memory. Hereinafter, the level one cache memory and the level two cache memory will be respectively referred to as a primary cache memory and a secondary cache memory.

An operation processing device including processor cores as a plurality of operation processing units includes, for example, primary cache memories provided in correspondence with the processor cores and a secondary cache memory shared by the plurality of processor cores. Hereinafter, the secondary cache memory shared by the plurality of processor cores will be referred to as a shared cache memory.

The storage capacity of the shared cache memory is larger than the storage capacity of the primary cache memory. The shared cache memory retains a part of data stored in the main memory device, and the primary cache memory retains a part of data retained in the shared cache memory. The shared cache memory retains management information for management of data retained in each primary cache memory.

The shared cache memory is accessed in a case where access target data is not retained in the primary cache memory (in a case where a cache miss occurs in the primary cache memory). The primary cache memory, in a case where a cache miss occurs, transfers a read request from the processor core to the shared cache memory. The shared cache memory transfers data specified by the read request to the processor core through the primary cache memory in a case where the shared cache memory retains data specified by the read request (in a case where a cache hit occurs in the shared cache memory). The processor core uses the data received from the shared cache memory in operation processing and the like. The primary cache memory retains the data received from the shared cache memory. Accordingly, the data specified by the read request is registered in the primary cache memory.

The primary cache memory performs replacement before registering the data received from the shared cache memory and notifies the completion of the replacement to the shared cache memory in a case where the replacement is completed. The replacement is a process of evicting some data (for example, data that is not used for the longest time) retained in the primary cache memory in a case where there is no region to register the data received from the shared cache memory. Hereinafter, replacement target data will be referred to as replaced data.

The shared cache memory performs a process related to the completion of the replacement. For example, the shared cache memory, in a case where the replaced data (replacement target data) is updated by a store operation of the processor core, performs a write-back that writes back the replaced data from the primary cache memory to the shared cache memory. Meanwhile, the shared cache memory, in a case where the processor core does not perform a store operation for the replaced data, performs a process of invalidating information related to the replaced data in the management information of the primary cache memory (hereinafter, referred to as invalidation). A write-back that writes back the replaced data from the primary cache memory to the shared cache memory is not performed in the invalidation.

The shared cache memory, for one read request, performs the invalidation and the like in addition to transfer of the data specified by the read request. Therefore, the frequency of data transfer to the primary cache memory that is based on the read request is at least one in two cycles (details will be described later) in the shared cache memory that performs each process of data transfer, a write-back, the invalidation, and the like in one cycle. Thus, the upper limit of the throughput of the shared cache memory is equal to 64 bytes/cycle in a case where, for example, the upper limit of the amount of data transfer in one cycle is equal to 128 bytes.

The number of processor cores that may share the shared cache memory having a throughput of 64 bytes/cycle for one read request is less than or equal to four in a case where the amount of data transfer by each processor core is equal to 16 bytes/cycle. The number of processor cores that may share the shared cache memory is increased by improvement in the throughput of the shared cache memory.

In one aspect, an object of an operation processing device and a method for controlling the operation processing device of the present disclosure is to improve the throughput of a shared cache memory.

SUMMARY

According to an aspect of the invention, an operation processing device includes: processors, first cache memories corresponding to each processors and retain data; and a second cache memory that is shared by the processors and connected to the first cache memories, wherein the second cache memory includes; a data retaining unit that retains data, a first information retaining unit that retains first management information for management of data in the first cache memories, a second information retaining unit that retains second management information for management of data in the data retaining unit, a classifying unit that classifies a request for a process performed by referencing the first management information and not referencing the second management information as a first type process request and classifies a request for a process performed by referencing the second management information as a second type process request, a second processing unit that references the second management information to perform a process of the second type process request, and a first processing unit that references the first management information and does not reference the second management information to perform a process of the first type process request, and is operable in parallel with the second processing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating one example of process requests received by an input unit illustrated in FIG. 3;

FIG. 12 is a diagram illustrating one example of a correspondence between the process requests and process information and operation information illustrated in FIG. 7;

FIG. 13 is a diagram illustrating one example of operation of a process determining unit illustrated in FIG. 7;

FIG. 14 is a diagram illustrating one example of operation of a process determining unit illustrated in FIG. 10;

DESCRIPTION OF EMBODIMENTS

Hereinafter, embodiments will be described by using the drawings.

Figure 1:
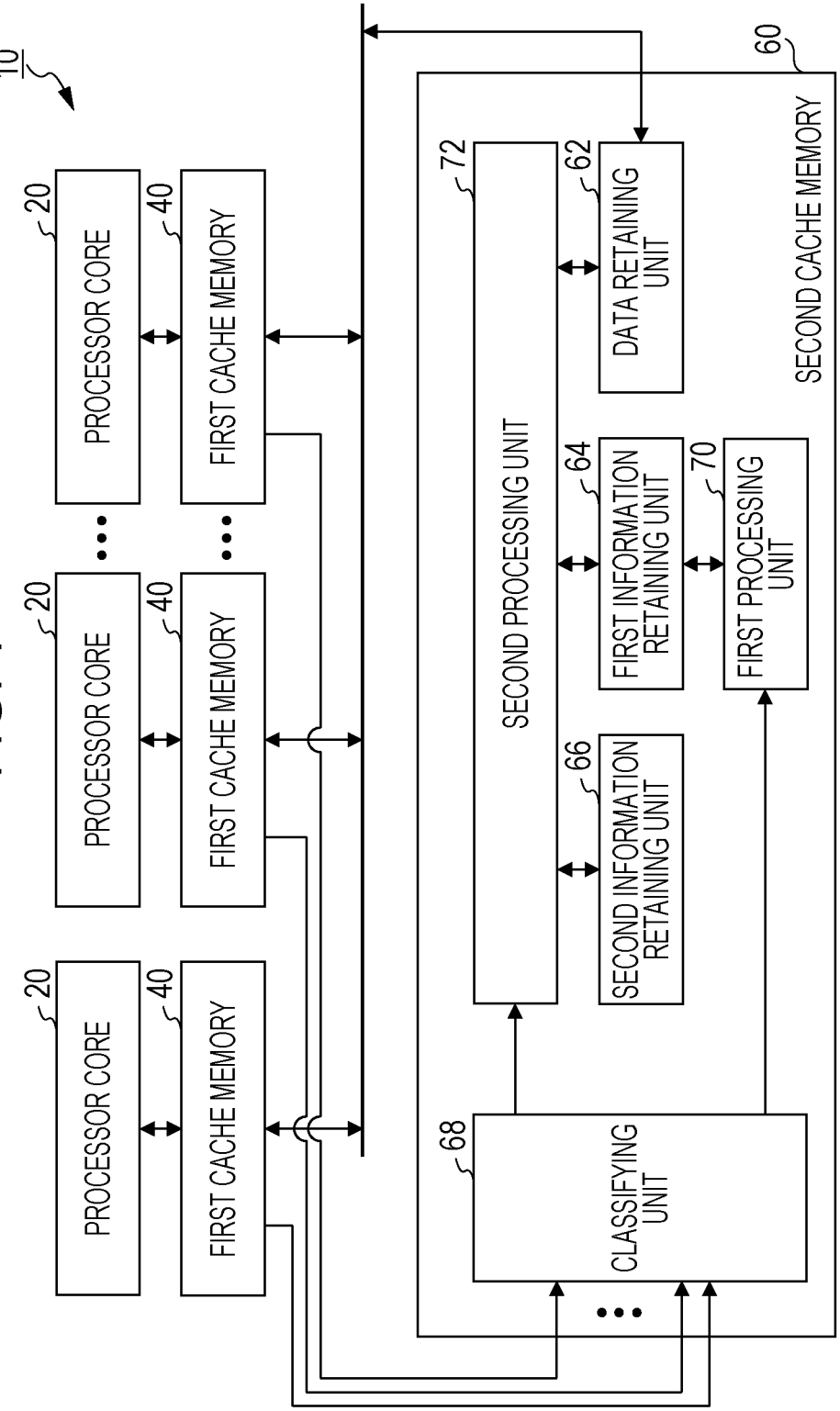
FIG. 1 is a diagram illustrating one embodiment of an operation processing device and a method for controlling the operation processing device.

FIG. 1 is a diagram illustrating one embodiment of an operation processing device and a method for controlling the operation processing device. An operation processing device 10 illustrated in FIG. 1 is a processor such as a CPU that executes instructions. The operation processing device 10 includes a plurality of processor cores 20 as a plurality of operation processing units (or simply, processors) that executes instructions, a plurality of first cache memories 40 that is provided in correspondence with the plurality of processor cores 20, and a second cache memory 60 that is shared by the plurality of processor cores 20.

Each processor core 20 references data retained in the corresponding first cache memories 40 to perform operations and the like based on instructions.

Each first cache memory 40 is, for example, a set-associative type cache memory and is a primary cache memory that is accessible at a higher speed than the second cache memory 60. Each first cache memory 40 retains a part of data retained in the second cache memory 60. For example, the first cache memory 40, in a case where the first cache memory 40 receives a read request from the processor core 20, transfers data specified by the read request to the processor core 20. The first cache memory 40 transfers the read request to the second cache memory 60 in a case where the first cache memory 40 does not retain the data specified by the read request (in a case where a cache miss occurs in the first cache memory 40).

Each first cache memory 40, for example, determines whether or not a cache miss occurs by referencing an information retaining unit (not illustrated) that retains tag addresses and the like of data retained therein for each index address corresponding to a cache line number. The index address corresponds to a bit group corresponding to one part of a memory address used for data access, and the tag address corresponds to a bit group corresponding to the other part of the memory address.

The second cache memory 60 is, for example, a set-associative type cache memory and is connected to the plurality of first cache memories 40. That is, the second cache memory 60 is a secondary cache memory of a lower level than the first cache memory 40. The second cache memory 60 includes a data retaining unit 62, a first information retaining unit 64, a second information retaining unit 66, a classifying unit 68, a first processing unit 70, and a second processing unit 72.

The data retaining unit 62 retains a part of data stored in a main memory device, not illustrated, and the like (a memory unit of a lower level than the second cache memory 60). The data retaining unit 62, in a case where the second cache memory 60 receives a read request from the first cache memory 40, transfers data specified by the read request to the first cache memory 40 which is the requester.

The second cache memory 60 obtains data specified by the read request from the main memory device and the like in a case where the data retaining unit 62 does not retain the data specified by the read request (in a case where a cache miss occurs in the second cache memory 60). The second cache memory 60 transfers the data specified by the read request (the data obtained from the main memory device and the like) to the requester first cache memory 40 and stores the data in the data retaining unit 62. The storage capacity of the data retaining unit 62 is larger than the storage capacity of the first cache memory 40.

The data retaining unit 62, in a case where a write-back that writes back replaced data which is replacement target data from the first cache memory 40 to the second cache memory 60 is performed, retains the replaced data received from the first cache memory 40. Replacement in the first cache memory 40 is a process of evicting some data retained in the first cache memory 40 in a case where, for example, there is no region to store data transferred from the second cache memory 60 in the first cache memory 40. The replaced data that is evicted by the replacement from the first cache memory 40 is, for example, data that is not used for the longest time.

The first information retaining unit 64 retains first management information for management of data retained in the plurality of first cache memories 40. For example, the first information retaining unit 64 retains a plurality of pieces of the first management information respectively corresponding to the plurality of first cache memories 40 for each of the index addresses of each first cache memory 40. That is, the first information retaining unit 64 retains a plurality of the first management information respectively corresponding to the plurality of first cache memories 40 for the index addresses having the same value. The first management information retained in the first information retaining unit 64 is used for, for example, maintaining the consistency of data retained in the plurality of first cache memories 40 (cache coherency).

The first management information, for example, includes a tag address, a type code, and the like of the first cache memory 40. The type code included in the first management information indicates the state of data (cache line) specified by an index address and a tag address of the first cache memory 40. The MESI protocol classifies the state of data as any of Modified, Exclusive, Shared, and Invalid. For example, the state of dirty data updated by a store operation and the like is classified as Modified. The state of clean data that is retained in only one first cache memory 40 of the plurality of first cache memories 40 of the same level and is not updated is classified as Exclusive. The state of clean data that is also retained in another first cache memory 40 of the first cache memories 40 of the same level is classified as Shared. The state of meaningless data such as data after initialization of the first cache memory 40 and invalidated data is classified as Invalid.

Figure 5:
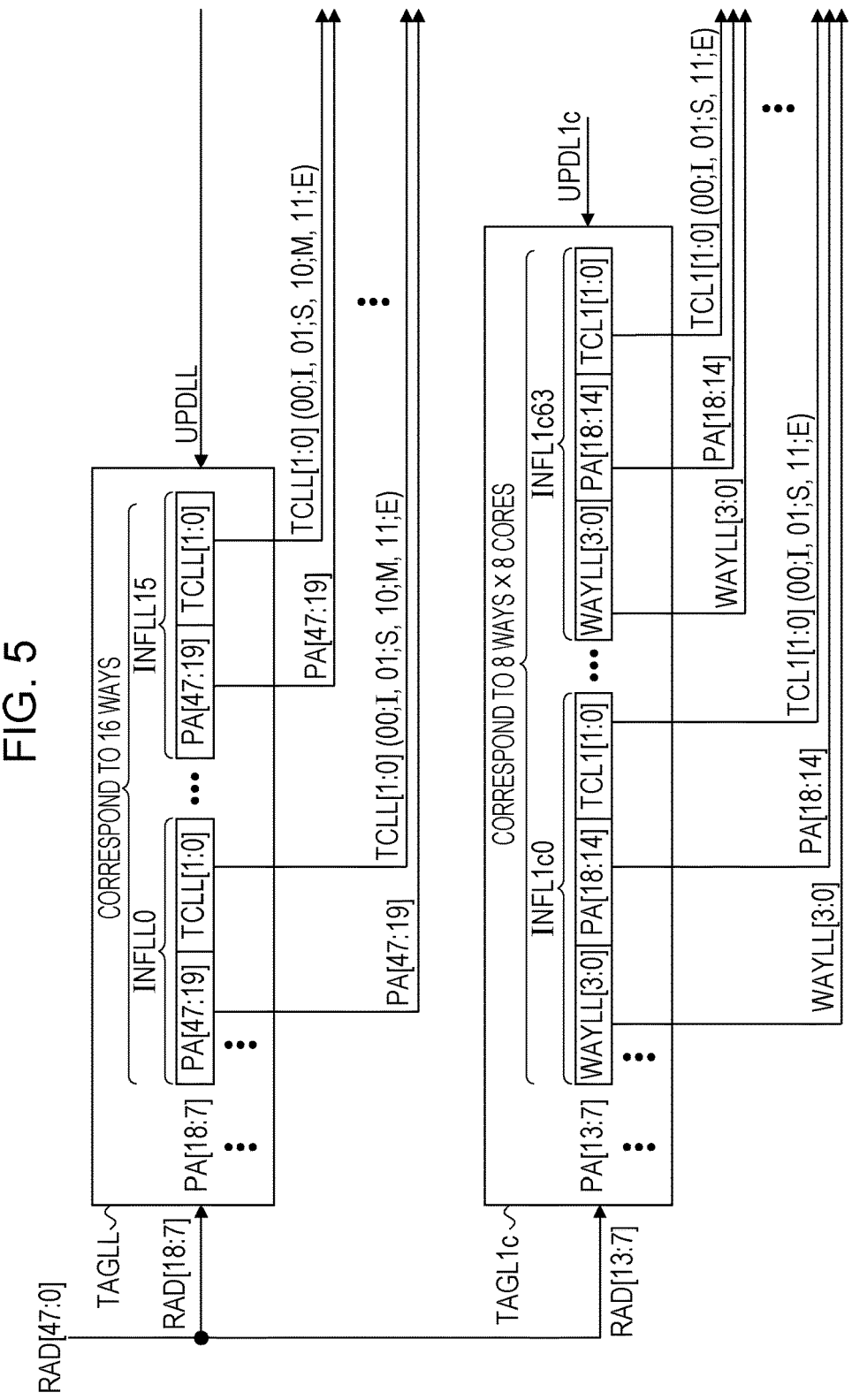
FIG. 5 is a diagram illustrating one example of a management information retaining unit illustrated in FIG. 3.

The first management information may include information corresponding to a tag address of the first cache memory 40 (for example, way information WAYLL[3:0] and a type code TCL1[1:0] illustrated in FIG. 5) instead of a tag address of the first cache memory 40.

The second information retaining unit 66 retains second management information for management of data retained in the data retaining unit 62. For example, the second information retaining unit 66, for each index address of the second cache memory 60, retains the second management information that includes a tag address, a type code, and the like of the second cache memory 60. An index address of the second cache memory 60 corresponds to a cache line number of the second cache memory 60 (a cache line of the data retaining unit 62). The type code included in the second management information, in the same manner as the type code included in the first management information, indicates the state of data (cache line) specified by an index address and a tag address of the second cache memory 60.

The classifying unit 68 receives a plurality of process requests including a read request from any of the plurality of first cache memories 40 and classifies the received process requests based on the types of requests. For example, the classifying unit 68 classifies, as a first type process request, a request for a process, of the plurality of process requests, that is performed by referencing the first management information and not referencing the second management information. The classifying unit 68 classifies, as a second type process request, a request for a process, of the plurality of process requests, that is performed by referencing at least the second management information of the first management information and the second management information. The classifying unit 68 inputs the first type process request of the plurality of process requests into the first processing unit 70 and inputs the second type process request of the plurality of process requests into the second processing unit 72.

The classifying unit 68, in a case where, for example, the classifying unit 68 receives a read request from the first cache memory 40, inputs the read request into the second processing unit 72 because the second management information is referenced in searching for data specified by the read request. The classifying unit 68, in a case where the classifying unit 68 receives a request for completion of the replacement, of types of replacement, that does not accompany a write-back of the replaced data, inputs the request for completion of the replacement into the first processing unit 70 because the second management information is not referenced in the completion of the replacement. The classifying unit 68, in a case where the classifying unit 68 receives a request for a write-back of the replaced data of types of replacement, inputs the request for a write-back of the replaced data into the second processing unit 72 because the second management information is referenced in updating the second management information related to the replaced data. The classifying unit 68 determines, based on the type of process request, which one of the first processing unit 70 and the second processing unit 72 a process request is to be output to.

The first processing unit 70 references the first management information and does not reference the second management information to perform a process that is based on the first type process request received from the classifying unit 68. The first processing unit 70 is operable in parallel with the second processing unit 72.

The second processing unit 72 performs a process that is based on the second type process request received from the classifying unit 68, based on at least the second management information of the first management information retained in the first information retaining unit 64 and the second management information retained in the second information retaining unit 66.

The second processing unit 72, in a case where, for example, the second processing unit 72 receives a read request, references the second management information retained in the second information retaining unit 66 to determine whether or not a cache hit occurs in the second cache memory 60. A cache hit occurs in the second cache memory 60 in a case where the data retaining unit 62 retains data specified by the read request. The second processing unit 72 performs a process of transferring the data specified by the read request from the data retaining unit 62 to the requester first cache memory 40 in a case where a cache hit occurs in the second cache memory 60.

The second processing unit 72, in a case where, for example, the second processing unit 72 receives a request for a write-back of the replaced data, stores the replaced data received from the first cache memory 40 in the data retaining unit 62 and updates the second management information retained in the second information retaining unit 66.

The second cache memory 60 may perform a process that is based on the second type process request (process performed by the second processing unit 72) and a process that is based on the first type process request (process performed by the first processing unit 70) since the first processing unit 70 and the second processing unit 72 are operable in parallel with each other.

The second processing unit 72, for example, receives read requests in order in a case where cache misses consecutively occur in the first cache memory 40 and where all of the replaced data evicted by the cache misses from the first cache memory 40 is clean data (data not updated). The second processing unit 72 transfers data specified by the read requests from the data retaining unit 62 to the first cache memory 40. The first management information related to the replaced data evicted by the cache misses from the first cache memory 40 is updated by the second processing unit 72 to the first management information related to the data specified by the read requests. Accordingly, the first information retaining unit 64 retains the first management information related to the data specified by the read requests.

The first processing unit 70 receives requests, in order, for completion of the replacement that does not accompany a write-back. The first processing unit 70, in a cycle in which the second processing unit 72 transfers data from the data retaining unit 62 to the first cache memory 40, performs completion of the replacement corresponding to the read request of the previous cycle.

Each process of a series of processes generated by the read request is performed in order by a processing unit corresponding to the second processing unit 72 in a configuration, for example, that does not include the first processing unit 70. In this case, a process that is based on the read request is not performed in parallel with completion of the replacement that does not accompany a write-back. Thus, data transfer from the data retaining unit 62 to the first cache memory 40 is performed once in two cycles in the configuration not including the first processing unit 70, even in a case where all of the replaced data is clean data and where performing a write-back is not desired.

Meanwhile, the second cache memory 60 including the first processing unit 70 and the second processing unit 72 may perform a process that is based on a read request (data transfer from the data retaining unit 62 to the first cache memory 40) in parallel with completion of the replacement that does not accompany a write-back. Thus, data transfer from the data retaining unit 62 to the first cache memory 40 may be performed in one cycle in a case where all of the replaced data evicted by cache misses from the first cache memory 40 is clean data. In this case, the throughput of data transfer from the data retaining unit 62 to the first cache memory 40 is improved compared with the above configuration that does not include the first processing unit 70 (compared with a case where data transfer is performed once in two cycles). That is, the operation processing device 10 may improve the throughput of the second cache memory 60 compared with an operation processing device that may not perform a process based on a read request in parallel with completion of the replacement not accompanying a write-back.

The configuration of the operation processing device 10 is not limited to the example illustrated in FIG. 1. For example, the first cache memory 40 and the second cache memory 60 may be cache memories of types other than the set-associative type (for example, a direct mapped type).

Figure 2:
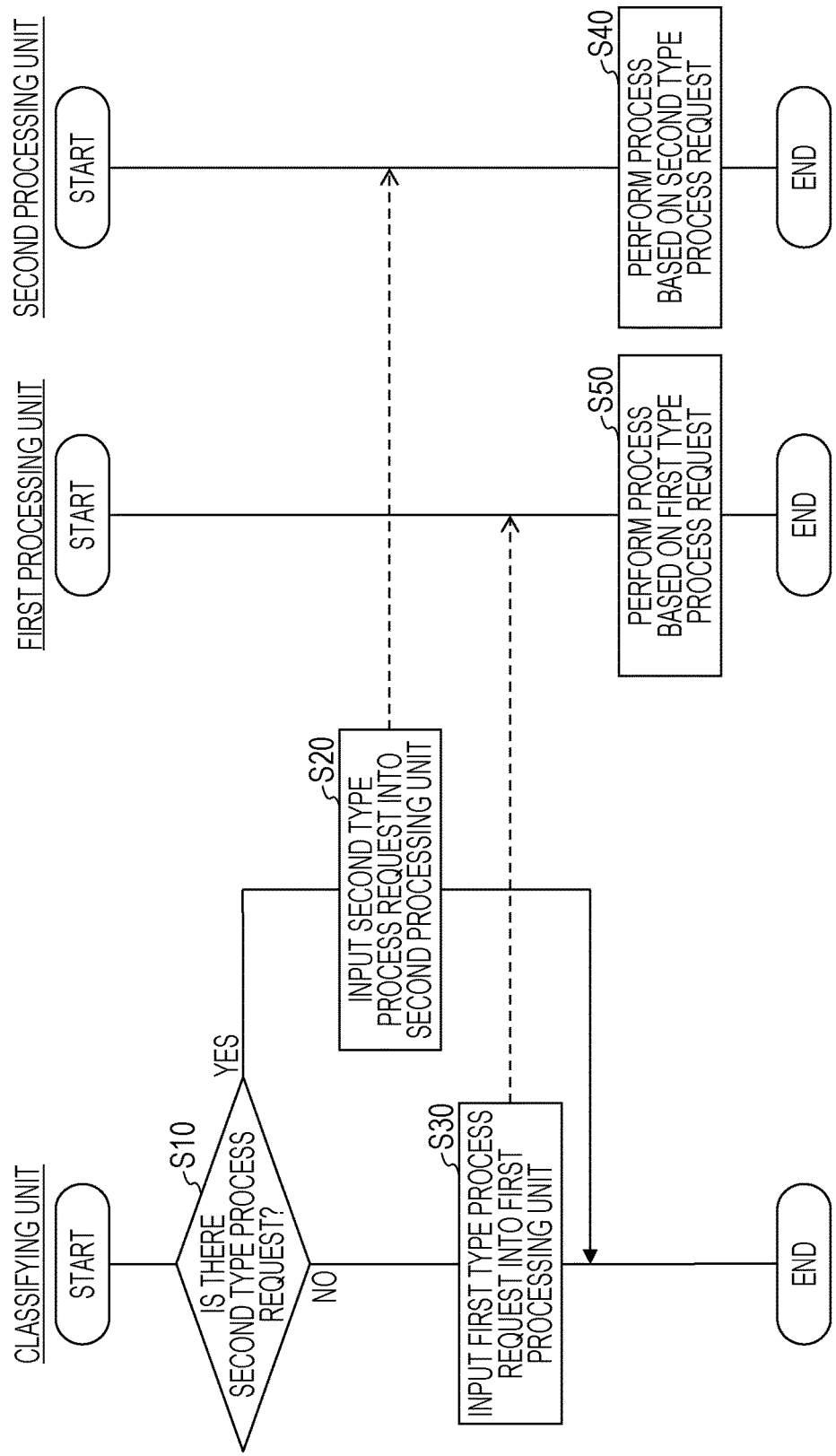
FIG. 2 is a diagram illustrating one example of operation of the operation processing device illustrated in FIG. 1.

FIG. 2 is a diagram illustrating one example of operation of the operation processing device 10 illustrated in FIG. 1. The operation illustrated in FIG. 2 is one aspect of the method for controlling the operation processing device. The operation illustrated in FIG. 2 may be realized by hardware only or may be realized by software-controlled hardware. FIG. 2 will be described with focus on operation of the classifying unit 68.

In Step S10, the classifying unit 68 determines whether or not a process request received from the first cache memory 40 and the like is the second type process request. The operation of the classifying unit 68 transitions to Step S20 in a case where the process request is the second type process request. Meanwhile, the operation of the classifying unit 68 transitions to Step S30 in a case where the process request is not the second type process request (that is, in a case where the process request is the first type process request).

In Step S20, the classifying unit 68 inputs into the second processing unit 72 the process request that is determined to be the second type process request in Step S10. That is, the classifying unit 68 inputs the second type process request into the second processing unit 72. Accordingly, the second processing unit 72 performs a process based on the second type process request in Step S40.

In Step S30, the classifying unit 68 inputs into the first processing unit 70 the process request that is determined to be the first type process request in Step S10. That is, the classifying unit 68 inputs the first type process request into the first processing unit 70. Accordingly, the first processing unit 70 performs a process based on the first type process request in Step S50.

The classifying unit 68 classifies a plurality of process requests as any of the first type process request and the second type process request, inputs the first type process request into the first processing unit 70, and inputs the second type process request into the second processing unit 72.

The process based on the first type process request may be performed in parallel with the process based on the second type process request since the first processing unit 70 is operable in parallel with the second processing unit 72. The operation of the operation processing device 10 is not limited to the example illustrated in FIG. 2.

In the embodiment illustrated in FIG. 1 and described heretofore, the second cache memory 60 may perform a process based on the first type process request (for example, completion of the replacement that does not accompany a write-back) in parallel with a process based on the second type process request such as a read request. Accordingly, the throughput of the second cache memory 60 may be improved compared with a technique that may not perform a process based on the first type process request in parallel with a process based on the second type process request.

Figure 3:
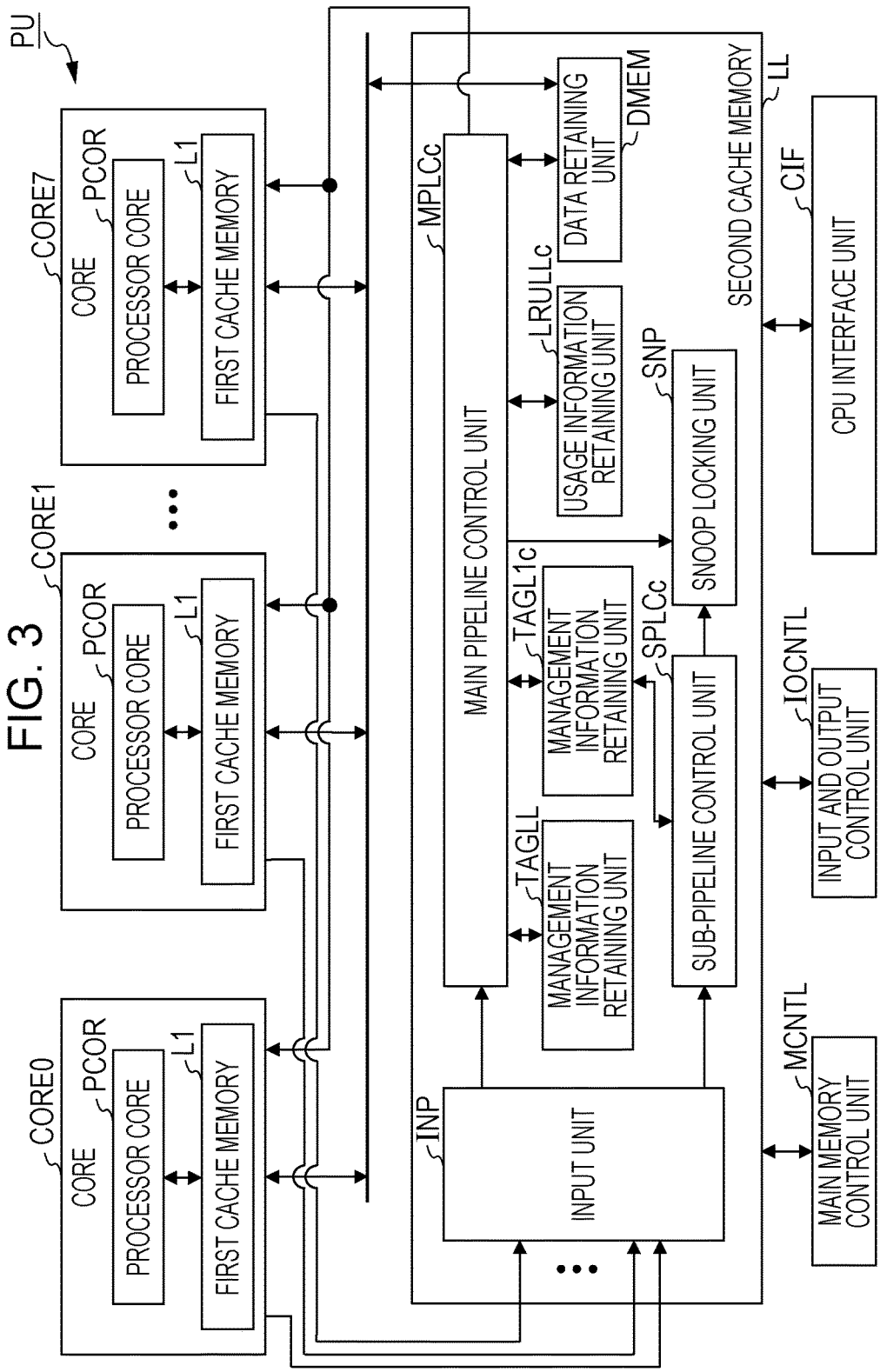
FIG. 3 is a diagram illustrating another embodiment of the operation processing device and the method for controlling the operation processing device.

FIG. 3 is a diagram illustrating another embodiment of the operation processing device and the method for controlling the operation processing device. The same or corresponding constituents as those described with FIG. 1 will be designated by the same or corresponding reference signs and will not be described in detail. An operation processing device PU illustrated in FIG. 3 is a processor such as a CPU that executes instructions.

The operation processing device PU includes a plurality of cores CORE (CORE0, CORE1, . . . , CORE7), a second cache memory LL, a main memory control unit MCNTL, an input and output control unit IOCNTL, and a CPU interface unit CIF. The number of cores CORE will be described as eight in FIG. 3 and the subsequent drawings. The number of cores CORE is not limited to eight.

Each core CORE includes a processor core PCOR and a first cache memory L1 that correspond to those of the other cores CORE, and is connected to the second cache memory LL.

The processor core PCOR is the same as or corresponds to the processor core 20 illustrated in FIG. 1. For example, the processor core PCOR references data retained in the first cache memory L1 to perform operations and the like based on instructions.

The first cache memory L1 is, for example, a set-associative type cache memory and is the same as or corresponds to the first cache memory 40 illustrated in FIG. 1. The first cache memory L1 is a primary cache memory that is accessible at a higher speed than the second cache memory LL, and retains a part of data retained in the second cache memory LL.

The second cache memory LL is a set-associative type cache memory and is connected to the main memory control unit MCNTL, the input and output control unit IOCNTL, the CPU interface unit CIF, the plurality of cores CORE, and the like. That is, the second cache memory LL is a secondary cache memory of a lower level than the first cache memory L1 and is shared by the plurality of cores CORE.

The second cache memory LL includes a data retaining unit DMEM, a management information retaining unit TAGL1c, a management information retaining unit TAGLL, and a usage information retaining unit LRULLc. The second cache memory LL includes an input unit INP, a main pipeline control unit MPLCc, a sub-pipeline control unit SPLCc, and a snoop lock unit SNP.

Figure 4:
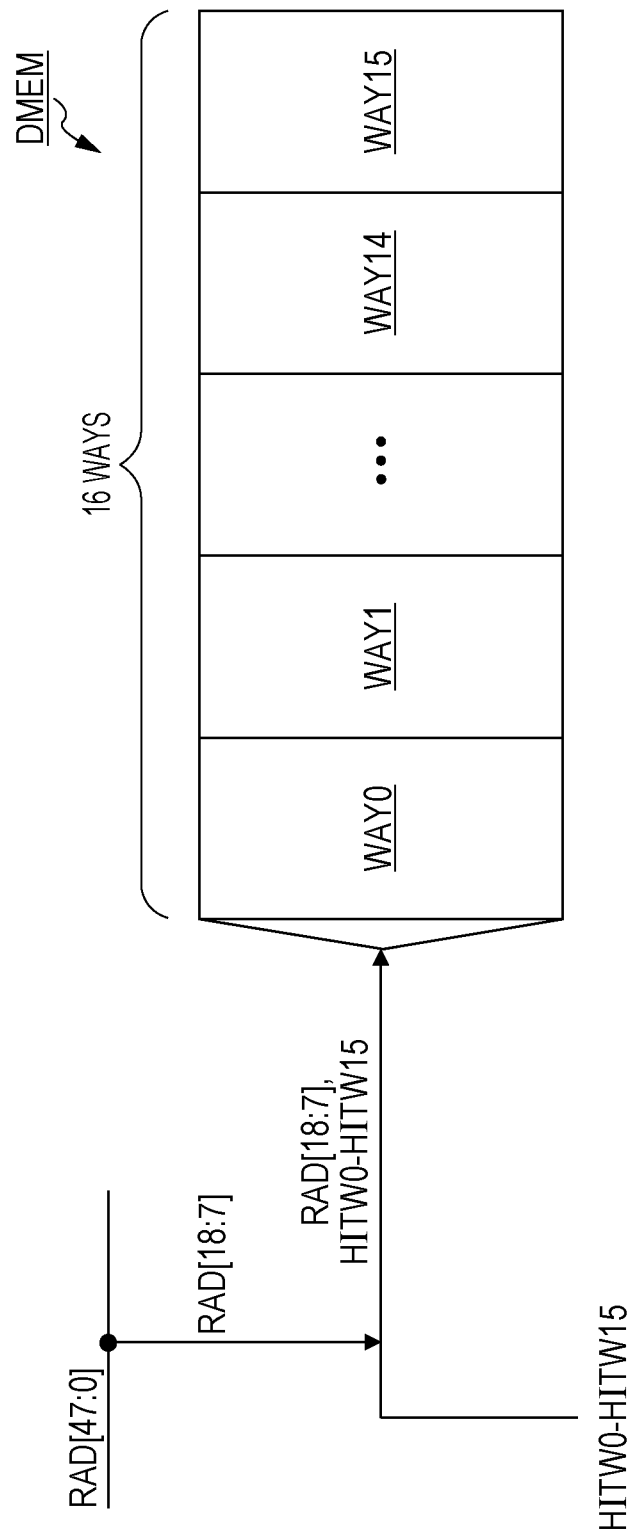
FIG. 4 is a diagram illustrating one example of a data retaining unit illustrated in FIG. 3.

The data retaining unit DMEM retains a part of data stored in a main memory device (not illustrated) and the like connected to the main memory control unit MCNTL. For example, the data retaining unit DMEM includes a plurality of ways, as illustrated in FIG. 4, that retains data for each index address. The storage capacity of the data retaining unit DMEM is larger than the storage capacity of the first cache memory L1.

The management information retaining unit TAGL1c retains the first management information for management of data retained in the plurality of first cache memories L1. The management information retaining unit TAGLL retains the second management information for management of data retained in the data retaining unit DMEM. Details of the management information retaining unit TAGL1c and the management information retaining unit TAGLL will be described with FIG. 5.

The usage information retaining unit LRULLc is one example of a selection information retaining unit that retains selection information for selection of a way, of the plurality of ways of the data retaining unit DMEM, having the longest wait time in which the way is not accessed by any of the plurality of first cache memories L1. Replacement that evicts some data retained in the second cache memory LL is performed in a case where, for example, a cache miss occurs in the second cache memory LL and where there is no region to register data transferred from the main memory device and the like to the second cache memory LL. At this point, the usage information retaining unit LRULLc uses the selection information and the least recently used (LRU) method to determine the way in which the data from the main memory device and the like is to be stored (that is the way that retains data to be evicted). Details of the usage information retaining unit LRULLc will be described with FIG. 6.

The input unit INP is one example of a classifying unit that classifies a plurality of process requests into the first type process request and the second type process request. The input unit INP receives a plurality of process requests including a read request and the like from the cores CORE and the like and classifies the received process requests based on the types of requests. For example, the input unit INP classifies, as the first type process request, a request for a process, of the plurality of process requests, that is performed by referencing the first management information and not referencing the second management information. The input unit INP classifies, as the second type process request, a request for a process, of the plurality of process requests, that is performed by referencing at least the second management information of the first management information and the second management information. The input unit INP inputs the first type process request of the plurality of process requests into the sub-pipeline control unit SPLCc and inputs the second type process request of the plurality of process requests into the main pipeline control unit MPLCc.

The input unit INP outputs the memory address and the like of process target data to the main pipeline control unit MPLCc, the sub-pipeline control unit SPLCc, and the like.

The main pipeline control unit MPLCc performs a process that is based on the second type process request received from the input unit INP, based on at least the second management information of the first management information retained in the management information retaining unit TAGL1c and the second management information retained in the management information retaining unit TAGLL.

The sub-pipeline control unit SPLCc references the first management information and does not reference the second management information to perform a process that is based on the first type process request received from the input unit INP. The sub-pipeline control unit SPLCc is operable in parallel with the main pipeline control unit MPLCc. Details of the main pipeline control unit MPLCc and the sub-pipeline control unit SPLCc will be described with FIG. 7 and the subsequent drawings.

The snoop lock unit SNP performs a snoop lock that blocks process requests to the same memory address as the data evicted from the first cache memory L1, based on instructions from the main pipeline control unit MPLCc, the sub-pipeline control unit SPLCc, and the like.

The main memory control unit MCNTL is connected with, for example, a main memory device (not illustrated) and the like of a lower level than the second cache memory LL. The main memory control unit MCNTL performs data transfer and the like between the second cache memory LL and the main memory device.

The input and output control unit IOCNTL is connected with, for example, an input and output device (not illustrated). The input and output control unit IOCNTL performs data transfer and the like between the second cache memory LL and the input and output device. The input and output device includes an input device such as a keyboard for input of data into the operation processing device PU, an output device such as a display that outputs a process result of the operation processing device PU, and the like.

The CPU interface unit CIF is connected with, for example, another operation processing device PU (not illustrated) or a connection interface device (not illustrated) for another system. The CPU interface unit CIF performs data transfer and the like between a device connected to the CPU interface unit CIF and the second cache memory LL.

The configuration of the operation processing device PU is not limited to the example illustrated in FIG. 3. For example, the first cache memory L1 and the second cache memory LL may be cache memories of types other than the set-associative type (for example, a direct mapped type). The number of levels of cache memories may be greater than or equal to three. In this case, a tertiary cache memory and the like may include the main pipeline control unit MPLCc and the sub-pipeline control unit SPLCc in the same manner as the second cache memory LL (secondary cache memory).

FIG. 4 illustrates one example of the data retaining unit DMEM illustrated in FIG. 3. The data retaining unit DMEM includes, for each index address RAD[18:7], a plurality of ways WAY (WAY0, WAY1, ..., WAY14, and WAY15) that retains data. The index address RAD[18:7] is one example of a second index that is represented by a bit group corresponding to a part of a memory address RAD[47:0] used for data access. The number of the ways WAY of the data retaining unit DMEM is 16 in the example illustrated in FIG. 4. That is, the second cache memory LL is a 16-way set-associative type cache memory. The number of the ways WAY of the data retaining unit DMEM is not limited to 16.

The data retaining unit DMEM receives hit way information HITW0 to HITW15 that indicates the access target way WAY, and the access target index address RAD[18:7]. The data retaining unit DMEM, in a case where, for example, the second cache memory LL receives a read request from the core CORE, outputs data specified by the index address RAD[18:7] and by the hit way information HITW0 to HITW15 to the core CORE which is the requester. Hereinafter, the access target memory address RAD will be referred to as the requested address RAD. The index address RAD [18:7] will be referred to as the address RAD[18:7].

FIG. 5 illustrates one example of the management information retaining units TAGLL and TAGL1c illustrated in FIG. 3. The management information retaining unit TAGLL illustrated in FIG. 5 is one example in a case where the second cache memory LL includes 16 ways and has a size of eight megabytes. The management information retaining unit TAGL1c illustrated in FIG. 5 is one example in a case where the first cache memory L1 includes eight ways (four ways for instructions and four ways for data) and has a size of 128 kilobytes. Cache lines of the first cache memory L1 and the second cache memory LL have a size of 128 bytes.

A cache line number of the first cache memory L1 is represented by an index address PA[13:7]. The index address PA[13:7] is specified by an index address RAD[13:7] that is represented by a bit group corresponding to a part (from the bit number 7 to the bit number 13) of the memory address RAD[47:0] used for data access. The index address RAD[13:7] is one example of a first index that is represented by a bit group corresponding to a part of the second index (the index address RAD[18:7]).

A cache line number of the second cache memory LL is represented by the index address PA[18:7]. The index address PA[18:7] is specified by the index address RAD[18:7] that is represented by a bit group corresponding to a part (from the bit number 7 to the bit number 18) of the memory address RAD[47:0].

The management information retaining unit TAGLL retains second management information INFLL (INFLL0, ..., INFLL15) corresponding in number to the ways of the second cache memory LL (corresponding to 16 ways in the example illustrated in FIG. 5) for one index address PA[18:7]. The number appended to the reference sign of the second management information INFLL corresponds to the number appended to the reference sign of the way WAY of the second cache memory LL. The management information retaining unit TAGLL retains the second management information INFLL of each way WAY for each index address PA[18:7] of the second cache memory LL.

Each second management information INFLL includes a tag address PA[47:19] and a type code TCLL[1:0] of the second cache memory LL. The tag address PA[47:19] of the second cache memory LL is represented by a bit group corresponding to a part (from the bit number 19 to the bit number 47) of the memory address RAD[47:0]. The type code TCLL[1:0] indicates the state of data (cache line) specified by the index address PA[18:7] and the tag address PA[47:19] of the second cache memory LL. The state of data is managed by using, for example, the MESI protocol.

The type code TCLL[1:0] is set to "00" in a case where the state of data is Invalid in the example illustrated in FIG. 5. The type code TCLL[1:0] is set to "01" in a case where the state of data is Shared. The type code TCLL[1:0] is set to "10" in a case where the state of data is Modified. The type code TCLL[1:0] is set to "11" in a case where the state of data is Exclusive.

The second management information INFLL retained by the management information retaining unit TAGLL is updated based on, for example, an update instruction UPDLL from the main pipeline control unit MPLCc.

The management information retaining unit TAGL1c retains a number of first management information INFL1c for one index address PA[13:7], the number being represented by the product of the number of ways of the first cache memory L1 and the number of the first cache memories L1. The management information retaining unit TAGL1c retains 64 pieces (=eight ways×eight cores) of the first management information INFL1c (INFL1c0, ..., INFL1c63) for one index address PA[13:7] in the example illustrated in FIG. 5.

The management information retaining unit TAGL1c retains the first management information INFL1c of each way in each first cache memory L1 for each index address PA[13:7] of the first cache memory L1. The quotient and the remainder in a case where the number appended to the reference sign of the first management information INFL1c is divided by eight respectively correspond to the number appended to the reference sign of the core CORE and the way number (from zero to seven) of the first cache memory L1 in the example illustrated in FIG. 5. For example, the first management information INFL1c0 indicates the first management information INFL1c of the zeroth way of the first cache memory L1 of the core CORE0. The first management information INFL1c63 indicates the first management information INFL1c of the seventh way of the first cache memory L1 of the core CORE7.

Each first management information INFL1c includes way information WAYLL[3:0], difference information PA[18:

14], and a type code TCL1[1:0]. The way information WAYLL[3:0] and the difference information PA[18:14] are information retained instead of the tag address PA[47:14] of the first cache memory L1. For example, the way information WAYLL[3:0] indicates the way WAY, of the plurality of ways WAY of the second cache memory LL, in which data specified by the index address PA[13:7] and the tag address PA[47:14] of the first cache memory L1 is retained. That is, the way information WAYLL[3:0] corresponds to the address PA[47:19] (the tag address PA[47:19] of the second cache memory LL) of the tag address PA[47:14].

The difference information PA[18:14] indicates the difference between the index address PA[13:7] of the first cache memory L1 and the index address PA[18:7] of the second cache memory LL. That is, the difference information PA[18:14] is represented by a bit group corresponding to a part (from the bit number 14 to the bit number 18) of the memory address RAD[47:0] and corresponds to the address PA[18:14] of the tag address PA[47:14]. The way information WAYLL[3:0] and the difference information PA[18:14] are used instead of the tag address PA[47:14] of the first cache memory L1.

The type code TCL1[1:0] indicates the state of data (cache line) specified by the index address PA[13:7] of the first cache memory L1, the way information WAYLL[3:0], and the difference information PA[18:14]. The state of data is managed by using, for example, the MESI protocol. The second cache memory LL does not detect the timing at which data retained in the first cache memory L1 is modified. Thus, the type code TCL1[1:0] is set to a value other than "10" that indicates that the state of data is Modified.

The first management information INFL1c retained by the management information retaining unit TAGL1c is updated based on, for example, an update instruction UPDL1c from the main pipeline control unit MPLCc or the sub-pipeline control unit SPLCc.

Figure 23:
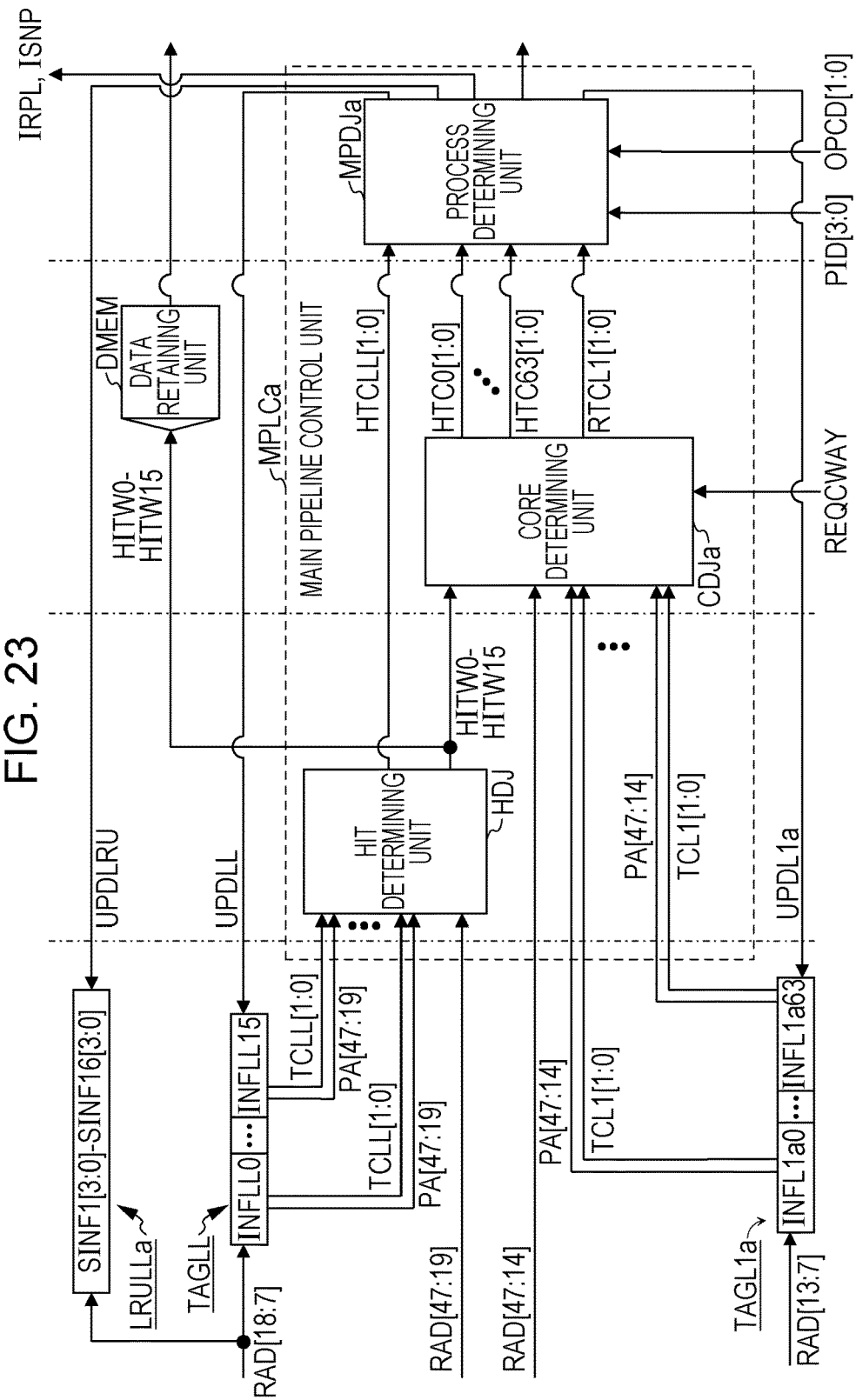
FIG. 23 is a diagram illustrating one example of a main pipeline control unit illustrated in FIG. 22.

The configurations of the management information retaining units TAGLL and TAGL1c are not limited to the example illustrated in FIG. 5. For example, the management information retaining unit TAGL1c may retain first management information INFL1a that includes the tag address PA[47:14] and the type code TCL1[1:0] of the first cache memory L1 as illustrated in FIG. 23 and the like.

Figure 6:
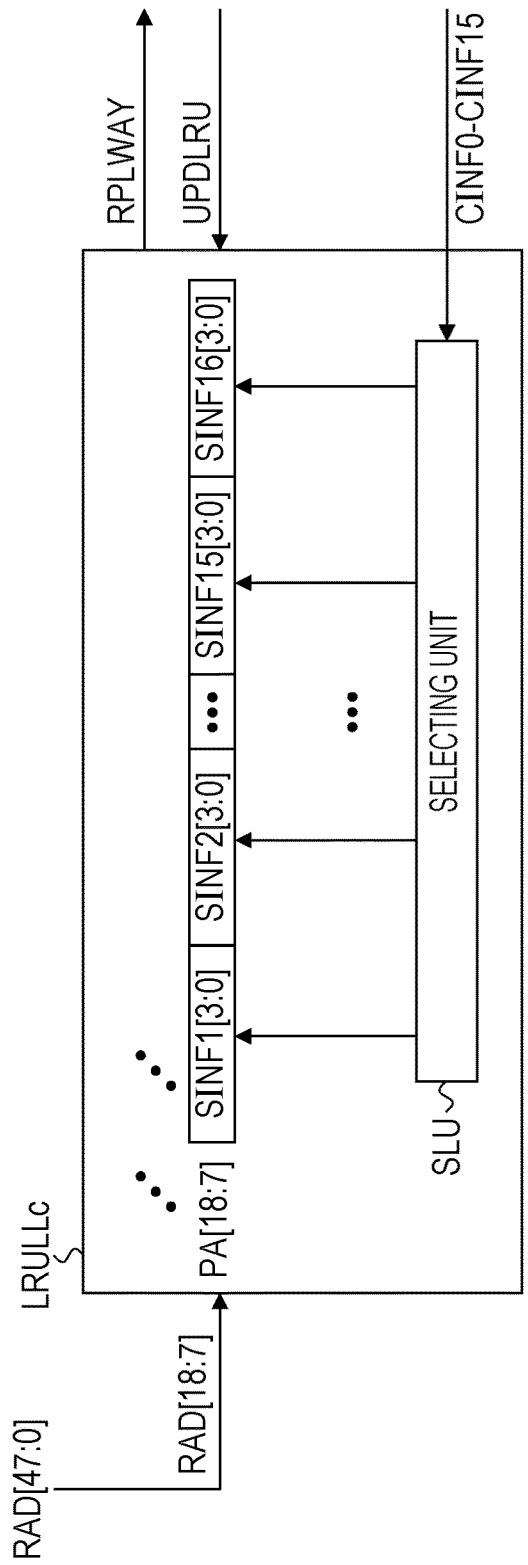
FIG. 6 is a diagram illustrating one example of a usage information retaining unit illustrated in FIG. 3.

FIG. 6 illustrates one example of the usage information retaining unit LRULLc illustrated in FIG. 3. The usage information retaining unit LRULLc illustrated in FIG. 6 is one example in a case where the number of ways of the second cache memory LL is 16.

The usage information retaining unit LRULLc retains selection information SINF (SINF1[3:0], SINF2[3:0], . . . , SINF15[3:0], and SINF16[3:0]) for each index address PA[18:7]. The way WAY that is registered in the selection information SINF1[3:0] is the way WAY, of the plurality of ways WAY of the data retaining unit DMEM, having the longest wait time in which the way WAY is not accessed by any of the plurality of first cache memories L1. The way WAY having a short wait time is registered in the selection information SINF having a large number appended to the reference sign SINF. The selection information SINF retained by the usage information retaining unit LRULLc is updated based on, for example, an update instruction UPDLRU from the main pipeline control unit MPLCc.

The usage information retaining unit LRULLc includes a selecting unit SLU. The selecting unit SLU selects the way WAY retaining data evicted from the second cache memory LL in a prioritized manner from the ways WAY of the plurality of ways WAY other than the way WAY indicated by possession information CINF0 to CINF15, based on the selection information SINF. For example, the selecting unit SLU selects the way WAY registered in the selection information SINF2[3:0] in a case where the way WAY indicated by the possession information CINF0 to CINF15 is the way WAY registered in the selection information SINF1[3:0]. The usage information retaining unit LRULLc outputs replaced way information RPLWAY that indicates the way WAY selected by the selecting unit SLU.

The way WAY that retains data, of the data specified by the address RAD[18:7] and retained in each of the plurality of ways WAY of the data retaining unit DMEM, retained in any of the plurality of first cache memories L1 is excluded from the replacement target. The probability that the data retained in the first cache memory L1 in the core CORE is referenced again by the processor core PCOR is higher than that of the data not retained in the first cache memory L1. Thus, a decrease in the frequency of cache hits may be reduced by excluding the way WAY, of the plurality of ways WAY of the second cache memory LL, retaining data retained in any of the plurality of first cache memories L1 from the replacement target.

The configuration of the usage information retaining unit LRULLc is not limited to the example illustrated in FIG. 6. For example, the selecting unit SLU may be externally provided with respect to the usage information retaining unit LRULLc.

Figure 7:
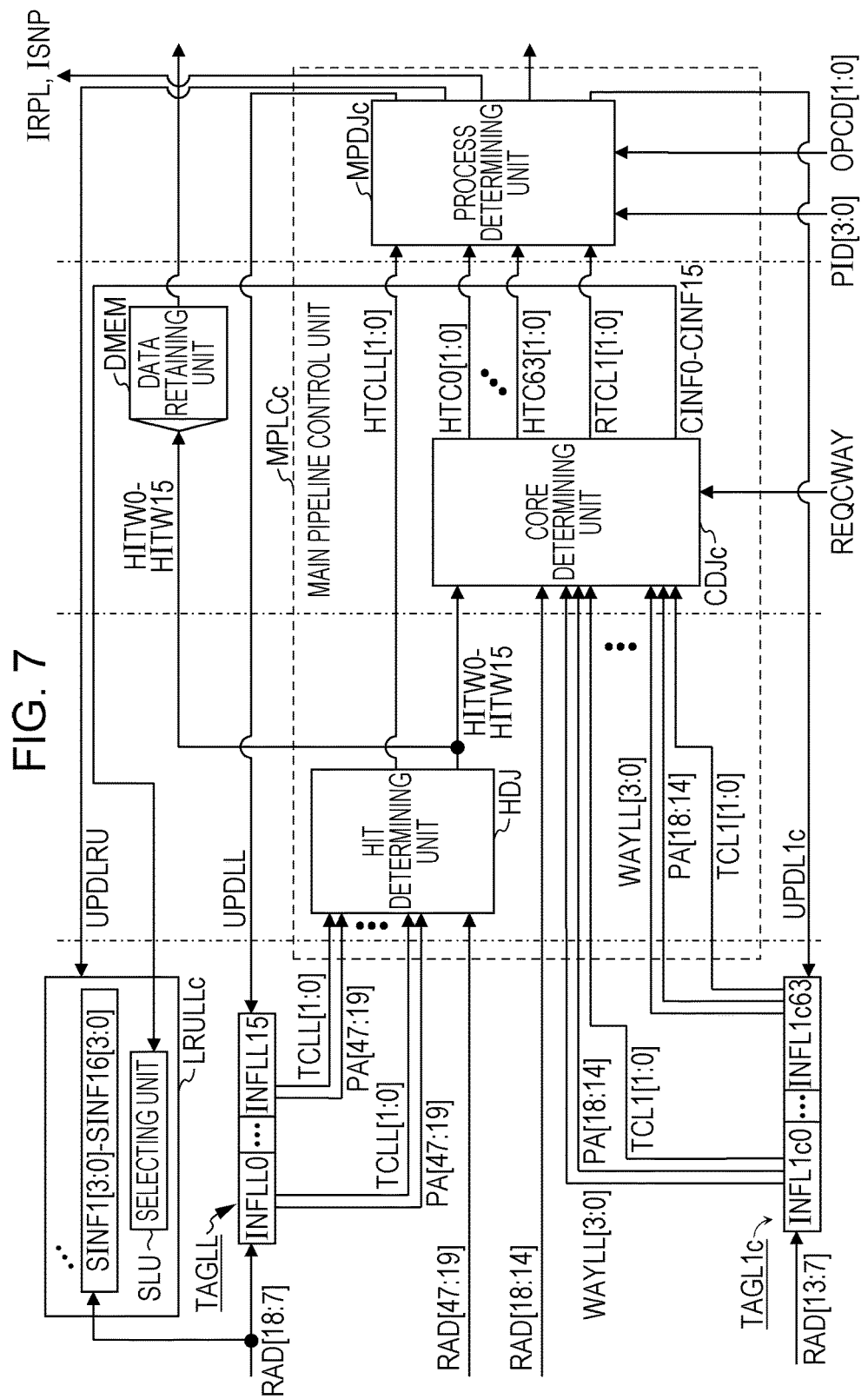
FIG. 7 is a diagram illustrating one example of a main pipeline control unit illustrated in FIG. 3.

FIG. 7 illustrates one example of the main pipeline control unit MPLCc illustrated in FIG. 3. Dot-dashed lines illustrated in FIG. 7 correspond to boundaries between each stage of a pipeline process. The address RAD[18:7] of the memory address RAD[47:0] is the access target index address RAD[18:7] and corresponds to the index address PA[18:7] of the second cache memory LL. The address RAD[47:19] of the memory address RAD[47:0] corresponds to the tag address PA[47:19] of the second cache memory LL. The address RAD[13:7] of the memory address RAD[47:0] corresponds to the index address PA[13:7] of the first cache memory L1.

The main pipeline control unit MPLCc includes a hit determining unit HDJ, a core determining unit CDJc, and a process determining unit MPDJc.

The hit determining unit HDJ determines whether or not a cache hit occurs in the second cache memory LL. For example, the hit determining unit HDJ receives the second management information INFLL0 to INFLL15 specified by the index address RAD[18:7] from the management information retaining unit TAGLL. Each second management information INFLL includes the tag address PA[47:19] and the type code TCLL[1:0] as described with FIG. 5.

The hit determining unit HDJ receives the address RAD[47:19] from the input unit INP. The hit determining unit HDJ compares the address RAD[47:19] with the tag address PA[47:19] in each second management information INFLL received from the management information retaining unit TAGLL. The hit determining unit HDJ determines a cache hit to occur in the second cache memory LL in a case where any tag address PA[47:19] in the second management information INFLL received from the management information retaining unit TAGLL matches the address RAD[47:19].

The hit determining unit HDJ outputs the hit way information HITW0 to HITW15 to the core determining unit CDJc, the data retaining unit DMEM, and the like and outputs hit data information HTCLL[1:0] to the process determining unit MPDJc. The hit way information HITW0 to HITW15 indicates the way WAY in which a cache hit occurs (the way WAY that retains the access target data), and the hit data information HTCLL[1:0] indicates the state of data for which a cache hit occurs. The number appended to the reference sign of the hit way information HITW corresponds to the number appended to the reference sign of the way WAY of the second cache memory LL (the way WAY of the data retaining unit DMEM illustrated in FIG. 4). All of the hit way information HITW0 to HITW15 and the hit data information HTCLL[1:0] are set to, for example, "0" in a case where a cache miss occurs in the second cache memory LL. Details of the hit determining unit HDJ will be described with FIG. 8.

The core determining unit CDJc determines whether or not a cache hit occurs in any of the plurality of first cache memories L1. For example, the core determining unit CDJc receives the first management information INFL1c0 to INFL1c63 specified by the index address RAD[13:7] from the management information retaining unit TAGL1c. The core determining unit CDJc receives requested way information REQCWAY that indicates the number and the like of the way of the first cache memory L1 in which data to be evicted from the first cache memory L1 is retained, and the address RAD[18:14] from the input unit INP. Each first management information INFL1c includes the way information WAYLL[3:0], the difference information PA[18:14], and the type code TCL1[1:0] as described with FIG. 5. The requested way information REQCWAY indicates, for example, the requester core CORE and a way number of the first cache memory L1 in the requester core CORE.

The core determining unit CDJc, for example, generates requested data information RTCL1[1:0] using the requested way information REQCWAY and the type code TCL1[1:0] in each first management information INFL1c. The core determining unit CDJc generates core data information HTC0[1:0] to HTC63[1:0] and the possession information CINF0 to CINF15 using the address RAD[18:14], each first management information INFL1c, and the hit way information HITW0 to HITW15. The number appended to the reference sign of the core data information HTC (the number after the reference sign HTC) corresponds to the number appended to the reference sign of the first management information INFL1c. The number appended to the reference sign of the possession information CINF corresponds to the number appended to the reference sign of the way WAY of the second cache memory LL.

The core data information HTC0[1:0] to HTC63[1:0] indicates the state of data (data retained in the first cache memory L1) for which a cache hit occurs in the first cache memory L1. The core data information HTC0[1:0] to HTC63[1:0] corresponding to data for which a cache miss occurs is set to, for example, "00".

The possession information CINF0 to CINF15 indicates the way WAY that retains data, of the data specified by the address RAD[18:7] and retained in each of the plurality of ways WAY of the data retaining unit DMEM, retained in any of the plurality of first cache memories L1.

The requested data information RTCL1[1:0] indicates the state of data, of the data specified by the address RAD[13:7], that is retained in the way of the first cache memory L1 specified by the requested way information REQCWAY. Details of the core determining unit CDJc will be described with FIG. 9.

The process determining unit MPDJc receives the hit data information HTCLL[1:0] from the hit determining unit HDJ and receives the core data information HTC0[1:0] to HTC63[1:0] and the requested data information RTCL1[1:0] from the core determining unit CDJc. The process determining unit MPDJc receives process information PID[3:0] and operation information OPCD[1:0] from the input unit INP.

The process determining unit MPDJc determines a process to be performed in the core CORE and the like based on the information HTC0[1:0] to HTC63[1:0], RTCL1[1:0], PID[3:0], and OPCD[1:0]. For example, the process determining unit MPDJc notifies the performance target core CORE of a replacement instruction IRPL to perform the replacement, a snoop instruction ISNP to perform a snoop, a data response, and the like. The snoop is a process of maintaining the consistency of data retained in the plurality of first cache memories L1 (cache coherency). The process determining unit MPDJc notifies a device that is externally provided with respect to the operation processing device PU of a process request and the like through the main memory control unit MCNTL and the like.

The process determining unit MPDJc updates information retained in the management information retaining units TAGLL and TAGL1c and in the usage information retaining unit LRULLc based on the information HTC0[1:0] to HTC63[1:0], RTCL1[1:0], PID[3:0], and OPCD[1:0]. For example, the process determining unit MPDJc outputs the update instruction UPDLL to the management information retaining unit TAGLL and outputs the update instruction UPDL1c to the management information retaining unit TAGL1c. The process determining unit MPDJc outputs the update instruction UPDLRU to the usage information retaining unit LRULLc.

Figure 8:
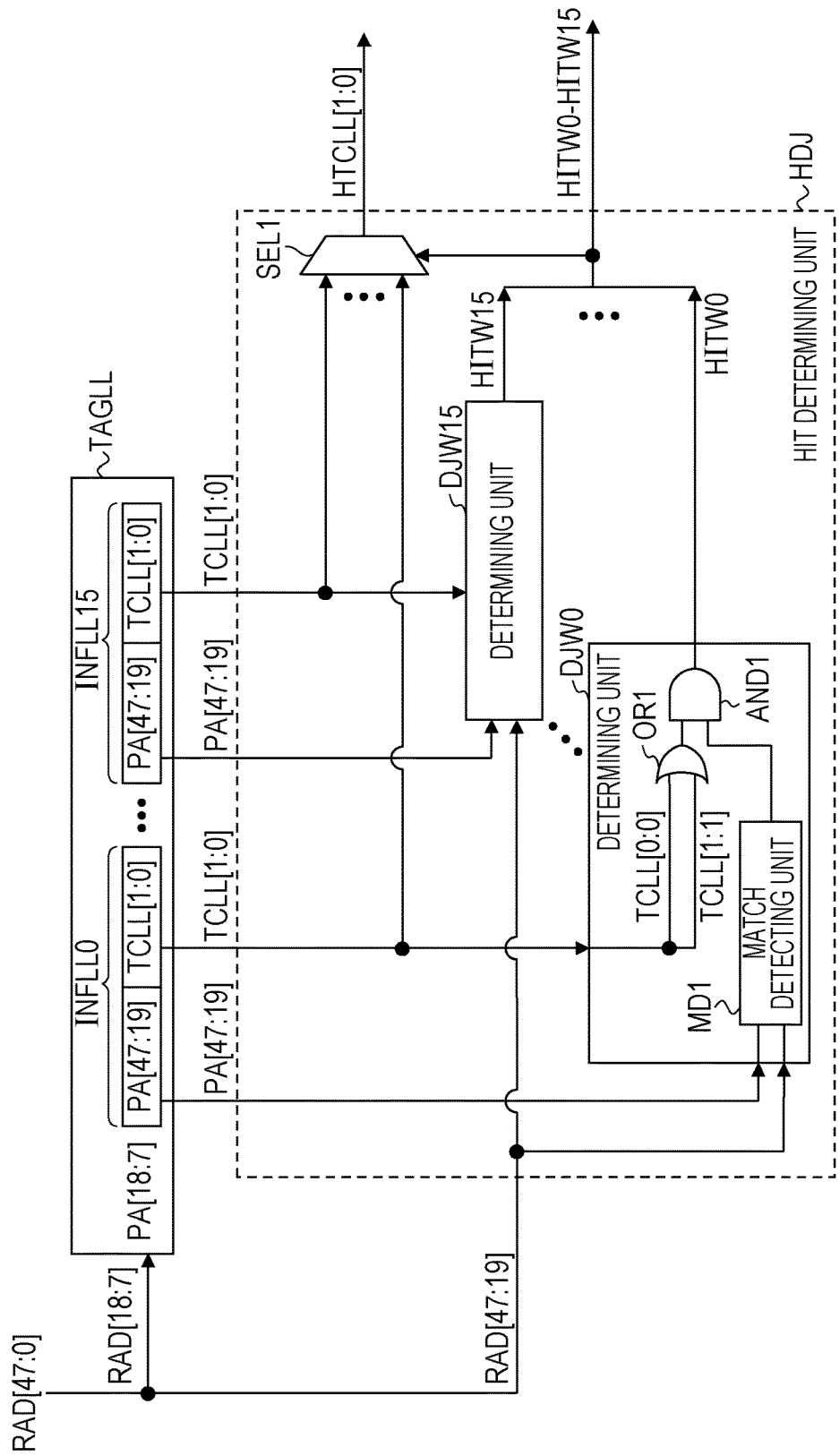
FIG. 8 is a diagram illustrating one example of a hit determining unit illustrated in FIG. 7.

FIG. 8 illustrates one example of the hit determining unit HDJ illustrated in FIG. 7. The hit determining unit HDJ includes a plurality of determining units DJW (DJW0 to DJW15) and a selecting unit SEL1. The number appended to the reference sign of the determining unit DJW corresponds to the number appended to the reference sign of the way WAY of the second cache memory LL. The plurality of determining units DJW is the same or corresponds to each other, and thus the determining unit DJW0 will be described.

The determining unit DJW0 includes a match detecting unit MD1, a logical sum circuit OR1, and a logical product circuit AND1. The match detecting unit MD1 receives from the management information retaining unit TAGLL the tag address PA[47:19] in the second management information INFLL0 corresponding to the index address PA[18:7] specified by the address RAD[18:7]. The match detecting unit MD1 compares the address RAD[47:19] received from the input unit INP with the tag address PA[47:19] in the second management information INFLL0 and outputs the comparison result to the logical product circuit AND1. The match detecting unit MD1, for example, outputs information indicating truth (for example, the logical value "1") as the comparison result to the logical product circuit AND1 in a case where the address RAD[47:19] matches the tag address PA[47:19]. The match detecting unit MD1 outputs information indicating falsity (for example, the logical value "0") as the comparison result to the logical product circuit AND1 in a case where the address RAD[47:19] does not match the tag address PA[47:19].

The logical sum circuit OR1 receives from the management information retaining unit TAGLL the type code TCLL[1:0] in the second management information INFLL0 corresponding to the index address PA[18:7] specified by the address RAD[18:7]. The logical sum circuit OR1 performs an operation to calculate the logical sum of the type code TCLL[0:0] and the type code TCLL[1:1] and outputs the operation result (the result of the logical sum of TCLL[0:0] and TCLL[1:1]) to the logical product circuit AND1.

The logical product circuit AND1 performs an operation to calculate the logical product of the comparison result of the match detecting unit MD1 and the operation result of the logical sum circuit OR1 and outputs the operation result as the hit way information HITW0 to the selecting unit SEL1, the data retaining unit DMEM, and the like. The determining unit DJW0, for example, outputs the hit way information HITW0 indicating truth (for example, the logical value "1") to the selecting unit SEL1, the data retaining unit DMEM, and the like in a case where the access target data is retained in the way WAY0 of the data retaining unit DMEM.

The selecting unit SEL1 receives from the management information retaining unit TAGLL the type code TCLL[1:0], as an input signal, in the second management information INFLL0 to INFLL15 corresponding to the index address PA[18:7] specified by the address RAD[18:7]. The selecting unit SEL1 receives the hit way information HITW0 to HITW15 as a selection signal from the determining units DJW0 to DJW15. The selecting unit SEL1 selects, as the hit data information HTCLL[1:0], the type code TCLL[1:0], of a plurality of type codes TCLL[1:0] received from the management information retaining unit TAGLL, that is specified by the hit way information HITW0 to HITW15. The selecting unit SEL1, for example, selects, as the hit data information HTCLL[1:0], the type code TCLL[1:0] in the second management information INFLL corresponding to the hit way information HITW indicating truth. The selecting unit SEL1 outputs the hit data information HTCLL[1:0] to the process determining unit MPDJc.

Figure 9:
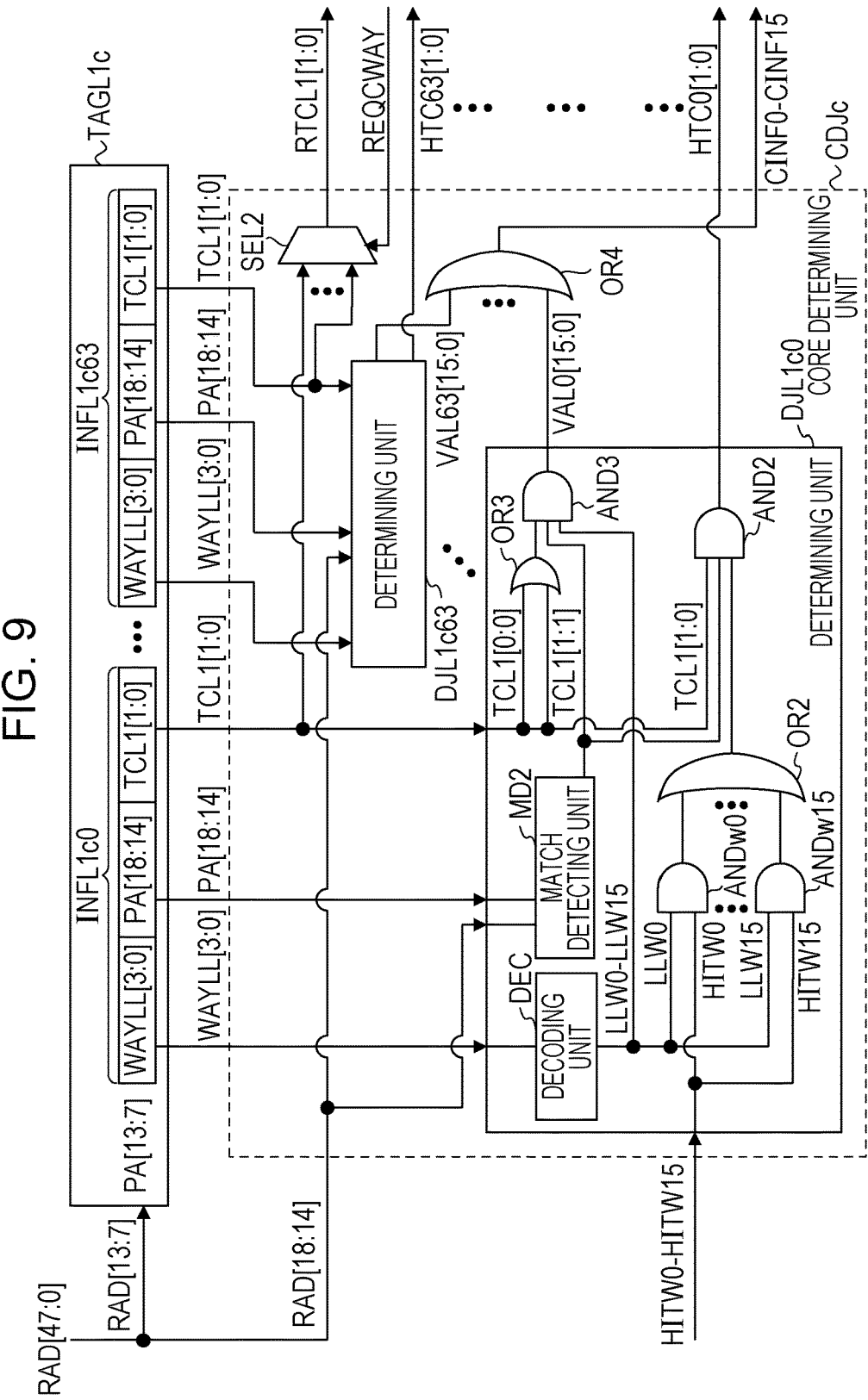
FIG. 9 is a diagram illustrating one example of a core determining unit illustrated in FIG. 7.

FIG. 9 illustrates one example of the core determining unit CDJc illustrated in FIG. 7. The core determining unit CDJc includes a plurality of determining units DJL1c (Wild) to DJL1c63), a logical sum circuit OR4, and a selecting unit SEL2. The number appended to the reference sign of the determining unit DJL1c corresponds to the number appended to the reference sign of the first management information INFL1c. The plurality of determining units DJL1c is the same or corresponds to each other, and thus the determining unit Mid) will be described.

The determining unit Wild) includes a decoding unit DEC, a match detecting unit MD2, logical sum circuits OR2 and OR3, and logical product circuits AND2, AND3, and ANDw0 to ANDw15. The number appended to the reference sign of the logical product circuit ANDw corresponds to the number appended to the reference sign of the way WAY of the second cache memory LL.

The decoding unit DEC receives from the management information retaining unit TAGL1c the way information WAYLL[3:0] in the first management information INFL1c0 corresponding to the index address PA[13:7] specified by the address RAD[13:7]. The decoding unit DEC decodes the logical value indicated by the way information WAYLL[3:0] and generates decoded information LLW0 to LLW15 that includes bits indicating truth or falsity for each of the plurality of ways WAY0 to WAY15. The decoding unit DEC, for example, sets the decoded information LLW15 to be true (for example, the logical value "1") and sets the decoded information LLW0 to LLW14 to be false (for example, the logical value "0") in a case where the way information WAYLL[3:0] indicates the decimal number "15".

The decoding unit DEC outputs the decoded information LLW0 to LLW15, which is decoded, to the logical product circuit AND3. The decoding unit DEC respectively outputs the decoded information LLW0 to LLW15 to the logical product circuits ANDw0 to ANDw15. For example, the decoding unit DEC outputs the decoded information LLW0 to the logical product circuit ANDw0.

The logical product circuit ANDw0 performs an operation to calculate the logical product of the hit way information HITW0 received from the determining unit DJW0 of the hit determining unit HDJ and the decoded information LLW0 received from the decoding unit DEC and outputs the operation result to the logical sum circuit OR2. The logical product circuits ANDw other than the logical product circuit ANDw0 are described by replacing the number appended to the reference signs of the determining unit DJW, the hit way information HITW, and the decoded information LLW in the description of the logical product circuit ANDw0 with the numbers corresponding to the logical product circuits ANDw.

The logical sum circuit OR2 performs an operation to calculate the logical sum of the operation results of each of the logical product circuits ANDw0 to ANDw15 and outputs the operation result to the logical product circuit AND2.

The match detecting unit MD2 receives from the management information retaining unit TAGL1c the difference information PA[18:14] in the first management information INFL1c0 corresponding to the index address PA[13:7] specified by the address RAD[13:7]. The match detecting unit MD2 compares the address RAD[18:14] received from the input unit INP with the difference information PA[18:14] in the first management information INFL1c0 and outputs the comparison result to the logical product circuits AND2 and AND3. The match detecting unit MD2, for example, outputs information indicating truth (for example, the logical value "1") as the comparison result to the logical product circuits AND2 and AND3 in a case where the address RAD[18:14] matches the difference information PA[18:14]. The match detecting unit MD2, for example, outputs information indicating falsity (for example, the logical value "0") as the comparison result to the logical product circuits AND2 and AND3 in a case where the address RAD[18:14] does not match the difference information PA[18:14].

The logical product circuit AND2 and the logical sum circuit OR3 receive from the management information retaining unit TAGL1c the type code TCL1[1:0] in the first management information INFL1c0 corresponding to the index address PA[13:7] specified by the address RAD[13:7].

The logical product circuit AND2 performs an operation to calculate the logical product of the comparison result of the match detecting unit MD2, the operation result of the logical sum circuit OR2, and the type code TCL1[1:0] received from the management information retaining unit TAGL1c and outputs the operation result as the core data information HTC0[1:0]. Both the comparison result of the match detecting unit MD2 and the operation result of the logical sum circuit OR2 are true (equal to, for example, the logical value "1") in a case where, for example, the access target data is retained in the zeroth way in the first cache memory L1 of the core CORE0. In this case, the determining unit Wild) outputs the type code TCL1[1:0], which is received from the management information retaining unit TAGL1c, as the core data information HTC0[1:0] to the process determining unit MPDJc.

The logical sum circuit OR3 performs an operation to calculate the logical sum of the type code TCL1[0:0] and the type code TCL1[1:1] and outputs the operation result (the result of the logical sum of TCL1[0:0] and TCL1[1:1]) to the logical product circuit AND3.

The logical product circuit AND3 performs an operation to calculate the logical product of each of the decoded information LLW0 to LLW15, the comparison result of the match detecting unit MD2, and the operation result of the logical sum circuit OR3 and outputs the operation result as individual possession information VAL0[15:0] to the logical sum circuit OR4. The 0th to 15th bits of the individual possession information VAL0[15:0] respectively correspond to the ways WAY0 to WAY15 of the second cache memory LL.

The individual possession information VAL0[0:0], for example, is set to be true (for example, the logical value "1") in a case where the data retained in the zeroth way in the first cache memory L1 of the core CORE0 is retained in the way WAY0 of the second cache memory LL. The individual possession information VAL0[15:15] is set to be true (for example, the logical value "1") in a case where the data retained in the zeroth way in the first cache memory L1 of the core CORE0 is retained in the way WAY15 of the second cache memory LL.

The logical sum circuit OR4 performs an operation to calculate, for each bit, the logical sum of the individual possession information VAL0[15:0] to VAL63[15:0] received from the determining units Wild) to DJL1c63 and outputs the operation results for each bit as the possession information CINF0 to CINF15 of 16 bits to the selecting unit SLU. For example, the possession information CINF0 is the result of the logical sum of the individual possession information VAL0[0:0] to VAL63[0:0], and the possession information CINF15 is the result of the logical sum of the individual possession information VAL0[15:15] to VAL63[15:15].

That is, the block that includes the decoding unit DEC, the match detecting unit MD2, the logical sum circuit OR3, and the logical product circuit AND3 of each determining unit DJL1c and includes the logical sum circuit OR4 is one example of a possession information generating unit that generates the possession information CINF based on the first management information INFL1c.

The logical sum circuit OR3 is one example of a state determining unit that determines, for each first index (the index address RAD[13:7]), whether or not data is valid based on the type code TCL1[1:0]. The match detecting unit MD2 is one example of a match determining unit that determines, for each first index, whether or not the address RAD[18:14] of the memory address RAD[47:0] of the access target data matches the difference information PA[18:14]. The logical product circuit AND3 is one example of a logical product unit that performs an operation to calculate, for each first index, the logical product of each bit of the decoded information LLW (the decoded information LLW0 to LLW15), the determination result of the state determining unit, and the determination result of the match determining unit. The logical sum circuit OR4 is one example of a logical sum unit that performs an operation to calculate, for each first index, the logical sum of the operation results of the logical product units respectively corresponding to the plurality of first cache memories L1 and outputs the operation result as the possession information CINF0 to CINF15 to the selecting unit SLU.

The selecting unit SEL2 receives from the management information retaining unit TAGL1c the type code TCL1[1:0], as an input signal, in the first management information INFL1c0 to INFL1c63 corresponding to the index address PA[13:7] specified by the address RAD[13:7]. The selecting unit SEL2 receives the requested way information REQCWAY as a selection signal from the input unit INP. The selecting unit SEL2 selects, as the requested data information RTCL1[1:0], the type code TCL1[1:0], of a plurality of type codes TCL1[1:0] received from the management information retaining unit TAGL1c, that is specified by the requested way information REQCWAY. The requested data information RTCL1[1:0] selected by the selecting unit SEL2 is transferred to the process determining unit MPDJc.

The management information retaining unit TAGLL, for example, in a method of the related art, retains core possession information (information corresponding to the type code TCL1[1:0]) of two bits that indicates, in the first cache memory L1, the state of data retained in the second cache memory LL. The process of excluding the way WAY of the second cache memory LL retaining the data retained in the first cache memory L1 from the replacement target (hereinafter, referred to as exclusion) is performed based on the core possession information in the method of the related art. The method of the related art that registers the core possession information in the management information retaining unit TAGLL may easily realize the exclusion without devising circuitry and the like, compared with a method that does not register the core possession information in the management information retaining unit TAGLL.

The operation processing device PU may generate the possession information CINF0 to CINF15 since the circuitry in the core determining unit CDJc is devised and thus may realize the exclusion. For example, the core determining unit CDJc includes the determining units Wild) to DJL1c63 that are devised to generate the individual possession information VAL0[15:0] to VAL63[15:0]. The logical sum circuit OR4 that generates the possession information CINF0 to CINF15 based on the individual possession information VAL0[15:0] to VAL63[15:0] is provided in the core determining unit CDJc. The possession information CINF corresponds to the result of the logical sum of the core possession information of two bits registered in the management information retaining unit TAGLL in the method of the related art. The operation processing device PU obtains the same or corresponding information as the method of the related art since the circuitry and the like in the core determining unit CDJc are devised.

Figure 10:
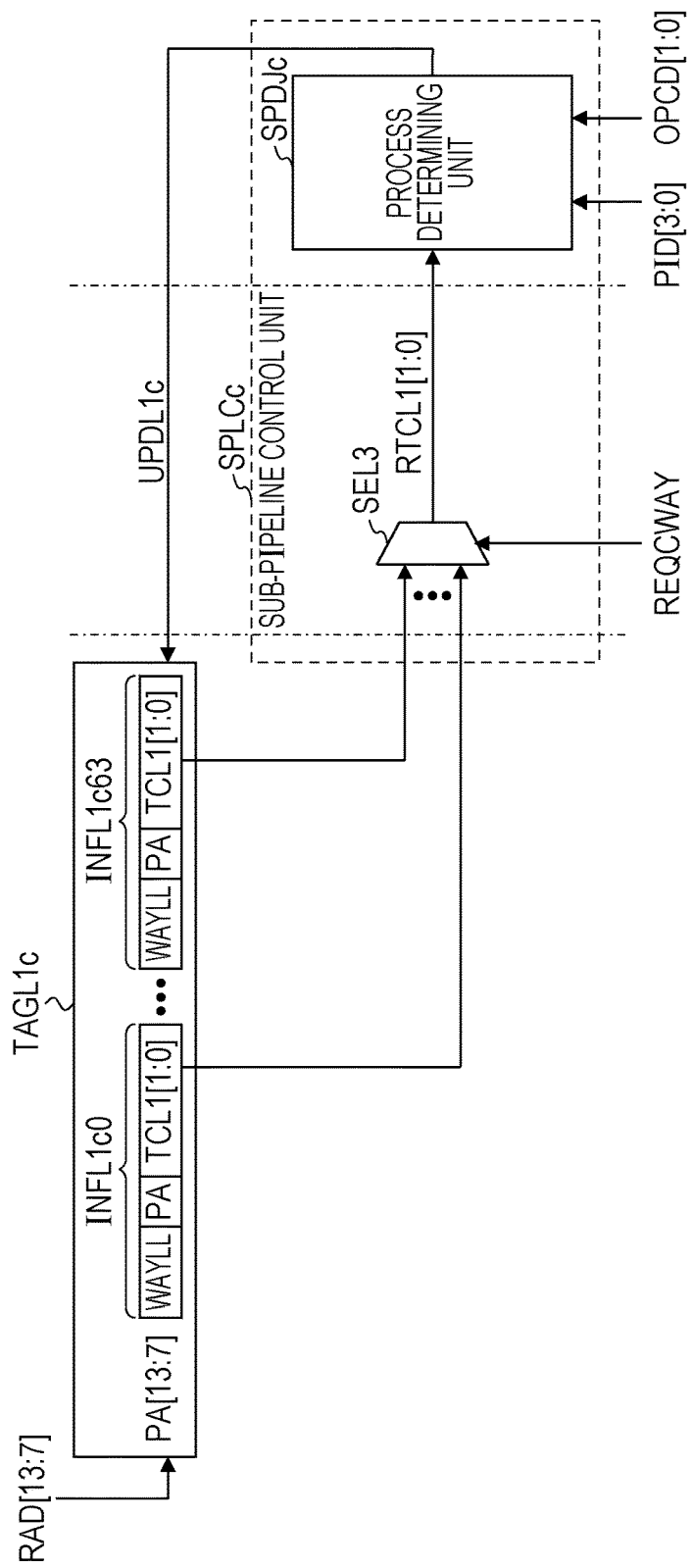
FIG. 10 is a diagram illustrating one example of a sub-pipeline control unit illustrated in FIG. 3.

FIG. 10 illustrates one example of the sub-pipeline control unit SPLCc illustrated in FIG. 3. Dot-dashed lines illustrated in FIG. 10 correspond to boundaries between each stage of a pipeline process. The sub-pipeline control unit SPLCc includes a selecting unit SEL3 and a process determining unit SPDJc.

The selecting unit SEL3 is the same as or corresponds to the selecting unit SEL2 illustrated in FIG. 9. For example, the selecting unit SEL3 selects, as the requested data information RTCL1[1:0], the type code TCL1[1:0], of a plurality of type codes TCL1[1:0] received from the management information retaining unit TAGL1c, that is specified by the requested way information REQCWAY. The selecting unit SEL3 outputs the requested data information RTCL1[1:0] to the process determining unit SPDJc.

The process determining unit SPDJc receives the requested data information RTCL1[1:0] from the selecting unit SEL3 and receives the process information PID[3:0] and the operation information OPCD[1:0] from the input unit INP. The process determining unit SPDJc updates the first management information INFL1c retained in the management information retaining unit TAGL1c based on the requested data information RTCL1[1:0], the process information PID[3:0], and the operation information OPCD[1:0]. For example, the process determining unit SPDJc outputs the update instruction UPDL1c to the management information retaining unit TAGL1c.

FIG. 11 illustrates one example of process requests received by the input unit INP illustrated in FIG. 3.

The second cache memory LL invalidates data of the first cache memory L1 and the second cache memory LL and outputs the data from the first cache memory L1 in a process based on a process request BPMO. The process request BPMO is a process request subsequent to process requests MORP and MOCO. Hereinafter, a process request that is subsequent to a predetermined process request will be referred to as a subsequent flow or a subordinate flow of the predetermined process request.

The second cache memory LL, in a process based on a process request BISR-L(L1-RPL), performs completion of the replacement (process related to the completion of the replacement) that does not accompany a write-back from the first cache memory L1 to the second cache memory LL. The process request BISR-L(L1-RPL) is the subordinate flow of a read request READ (hereinafter, referred to as a process request READ) and a process request MVIN.

The second cache memory LL, in a process based on a process request BISR-L(L1-CPB), invalidates data that is evicted by inter-L1 transfer (hereinafter, referred to as inter first cache memory L1 transfer) from the first cache memory L1. The inter first cache memory L1 transfer is a process of transferring data retained in one of two first cache memories L1 to the other. A write-back from the first cache memory L1 to the second cache memory LL is not performed in the process request BISR-L(L1-CPB). That is, the data evicted by the inter first cache memory L1 transfer from the first cache memory L1 is not written back to the second cache memory LL in the process request BISR-L(L1-CPB). The process request BISR-L(L1-CPB) is the subordinate flow of the process request READ.

The second cache memory LL invalidates data of the first cache memory L1 and the second cache memory LL in a process based on a process request BISR-R.

The second cache memory LL, in a process based on a process request WRBK(L1-RPL), performs completion of the replacement (process related to the completion of the replacement) that accompanies a write-back from the first cache memory L1 to the second cache memory LL. The process request WRBK(L1-RPL) is the subordinate flow of the process requests READ and MVIN.

The second cache memory LL, in a process based on a process request WRBK(L1-CPB), invalidates data that is evicted by the inter first cache memory L1 transfer from the first cache memory L1. A write-back from the first cache memory L1 to the second cache memory LL is performed in the process request WRBK(L1-CPB). That is, the data evicted by the inter first cache memory L1 transfer from the first cache memory L1 is written back to the second cache memory LL in the process request WRBK(L1-CPB). The process request WRBK(L1-CPB) is the subordinate flow of the process request READ.

The second cache memory LL invalidates data of the first cache memory L1 and the second cache memory LL and outputs the data of the second cache memory LL in a process based on a process request MOSR. The process request MOSR is the subordinate flow of the process requests MORP and MOCO.

The second cache memory LL, in a process based on the process request MORP, performs the replacement to evict data of the second cache memory LL in a case where a cache miss occurs in the second cache memory LL. The process request MORP is the subordinate flow of the process request READ.

The second cache memory LL, in a process based on the process request MVIN, registers data in the second cache memory LL and sends the data in response to the first cache memory L1 in a case where a cache miss occurs in the second cache memory LL. The process request MVIN is the subordinate flow of the process request READ.

The second cache memory LL performs a process in response to an external snoop instruction in a process based on the process request MOCO.

The second cache memory LL, in a process based on the process request READ (read request READ), sends data in response to the first cache memory L1 in a case where a cache hit occurs in the second cache memory LL. The second cache memory LL issues a read request to the main memory device and the like (a memory unit of a lower level than the second cache memory LL) in a case where a cache miss occurs in the second cache memory LL. The process request READ is, for example, a new requested flow that is not subordinate to other process requests.

FIG. 12 illustrates one example of a correspondence between the process requests and the process information PID[3:0] and the operation information OPCD[1:0] illustrated in FIG. 7. The shading in FIG. 12 indicates the first type process requests that are input into the sub-pipeline control unit SPLCc. As illustrated in FIG. 12, the process requests are specified by the process information PID[3:0], and the process requests specified by the process information PID[3:0] are classified by the operation information OPCD[1:0].

The process requests that are specified by the process information PID[3:0] of any of "1101", "1000", "1010", "1001", "0100", "0001", and "0101" are the second type process requests in the example illustrated in FIG. 12.

A set of the process information PID[3:0] equal to "1101" and the operation information OPCD[1:0] equal to "01", for example, indicates a process request READ(S) of the process request READ. The parenthesized "S" in the reference sign of the process request READ(S) corresponds to Shared of the MESI protocol. The process request READ(S) is the second type process request and is input into the main pipeline control unit MPLCc.

A set of the process information PID[3:0] equal to "1101" and the operation information OPCD[1:0] equal to "11" indicates a process request READ(E) of the process request READ. The parenthesized "E" in the reference sign of the process request READ(E) corresponds to Exclusive of the MESI protocol. The process request READ(E) is the second type process request and is input into the main pipeline control unit MPLCc.

The process request specified by the process information PID[3:0] of "0010" is either the first type process request or the second type process request. For example, a set of the process information PID[3:0] equal to "0010" and the operation information OPCD[1:0] equal to "01" indicates the process request BISR-L(L1-RPL). The process request BISR-L(L1-RPL) is the first type process request and is input into the sub-pipeline control unit SPLCc.

A set of the process information PID[3:0] equal to "0010" and the operation information OPCD[1:0] equal to "10" indicates the process request BISR-L(L1-CPB). The process request BISR-L(L1-CPB) is the first type process request and is input into the sub-pipeline control unit SPLCc.

FIG. 13 illustrates one example of operation of the process determining unit MPDJc illustrated in FIG. 7. That is, FIG. 13 illustrates one example of operation of the process determining unit MPDJc in the main pipeline control unit MPLCc. The reference sign "R" illustrated in FIG. 13 indicates that data is read from the data retaining unit DMEM, and the reference sign "W" indicates that data is written to the data retaining unit DMEM.

The reference signs "M", "E", "S", and "I" illustrated in FIG. 13 respectively correspond to Modified, Exclusive, Shared, and Invalid of the MESI protocol. The reference sign "I" indicates that all reference target data is invalid in a case where the reference target corresponds to a plurality of pieces of data (for example, in a case where the data of the plurality of first cache memories L1 other than the requester is the reference target). The reference sign "S" indicates that at least one reference target data is shared in a case where the reference target corresponds to a plurality of pieces of data. The reference sign "/" is used in FIG. 13 to represent a plurality of states in a case where any of the plurality of states is applicable. For example, the reference sign "I/S" in the reference field indicates that either all reference target data is invalid or at least one reference target data is shared. The reference sign E** in the DATA response field indicates a data response without data (in which data is not transferred) of the data responses that render the state of the process target data exclusive.

The process determining unit MPDJc identifies a process request based on the process information PID[3:0] and the operation information OPCD[1:0]. The process determining unit MPDJc receives the hit data information HTCLL[1:0] and the core data information HTC0[1:0] to HTC63[1:0] as a result of referencing the management information retaining units TAGLL and TAGL1c. For example, the result of referencing the management information retaining unit TAGLL is notified by the hit data information HTCLL[1:0]. The result of referencing the management information retaining unit TAGL1c is notified by the core data information HTC0[1:0] to HTC63[1:0].

The requester TAGL1c illustrated in FIG. 13 is the result of referencing the management information retaining unit TAGL1c corresponding to the requester first cache memory L1, and the other TAGL1c is the result of referencing the management information retaining unit TAGL1c other than the requester TAGL1c. The result of referencing the management information retaining unit TAGL1c corresponding to the requester first cache memory L1 is notified by the core data information HTC of the core data information HTC0[1:0] to HTC63[1:0] that corresponds to the requester.

The process determining unit MPDJc updates the management information retaining unit TAGLL and the like as illustrated in FIG. 13 based on a set of a process request, the result of referencing the management information retaining unit TAGLL, and the result of referencing the management information retaining unit TAGL1c (the requester TAGL1c and the other TAGL1c).

The second cache memory LL, for example, retains the process target data in the Shared state thereof (TAGLL: S) in the fourth process request READ(S) from the top of the process requests READ illustrated in FIG. 13. The requester first cache memory L1 does not retain the process target data (requester TAGL1c: I). The first cache memories L1 other than the requester either do not retain the process target data (other TAGL1c: I) or retain the process target data in the Shared state thereof (other TAGL1c: S).

In this case, the process determining unit MPDJc does not update and maintains the information retained in the management information retaining unit TAGLL. The process determining unit MPDJc updates the type code TCL1[1:0], of the type codes TCL1[1:0] retained in the management information retaining unit TAGL1c, corresponding to the process target data to "S" (for example, "01"). The process determining unit MPDJc reads the data requested by the process request READ(S) from the data retaining unit DMEM and outputs the replacement instruction IRPL and a shared data response including the data to the requester first cache memory L1. The process determining unit MPDJc updates the selection information SINF retained in the usage information retaining unit LRULLc since data is read from the data retaining unit DMEM.

The second cache memory LL receives the process request BISR-L(L1-RPL) as the subsequent flow of the process request READ(S) from the requester first cache memory L1 in a case where the target data of the replacement based on the replacement instruction IRPL is clean. The second cache memory LL receives the process request WRBK(L1-RPL) as the subsequent flow of the process request READ(S) from the requester first cache memory L1 in a case where the target data of the replacement based on the replacement instruction IRPL is dirty.

The process request BISR-L(L1-RPL) is input into the sub-pipeline control unit SPLCc as illustrated in FIG. 12. Meanwhile, the process request WRBK(L1-RPL) is input into the main pipeline control unit MPLCc.

The second cache memory LL, for example, retains the process target data in the Exclusive state or the Modified state thereof (TAGLL: E/M) in the process request WRBK (L1-RPL). The requester first cache memory L1 retains the process target data in the Exclusive state thereof (requester TAGL1c: E).

In this case, the process determining unit MPDJc updates the type code TCLL[1:0], of the type codes TCLL[1:0] retained in the management information retaining unit TAGLL, corresponding to the process target data to "M" (for example, "10"). The type code TCL1[1:0], of the type codes TCL1[1:0] retained in the management information retaining unit TAGL1c, corresponding to the process target data is previously updated by a process based on the preceding process request (for example, the process request READ(S)). Thus, the management information retaining unit TAGL1c is not updated (-* in FIG. 13**) in the process request WRBK(L1-RPL). The process determining unit MPDJc writes data received from the requester first cache memory L1 to the data retaining unit DMEM and ends a series of processes based on the process request WRBK(L1-RPL) and the preceding process request.

The second cache memory LL, for example, retains the process target data in the Shared state thereof (TAGLL: S) in the third process request READ(E) from the top of the process requests READ illustrated in FIG. 13. The requester first cache memory L1 either does not retain the process target data (requester TAGL1c: I) or retains the process target data in the Shared state thereof (requester TAGL1c: S). The first cache memories L1 other than the requester retain the process target data in the Shared state thereof (other TAGL1c: S).

In this case, the process determining unit MPDJc does not update and maintains the information retained in the management information retaining units TAGLL and TAGL1c and the usage information retaining unit LRULLc. The process determining unit MPDJc outputs the snoop instruction ISNP to the first cache memory L1, of the first cache memories L1 other than the requester, that retains the process target data. The process determining unit MPDJc requests an external device such as the main memory device to perform fetching.

The process requests MORP, MVIN, BISR-L(L1-CPB), and the like* in the subsequent (subordinate) flow field illustrated in FIG. 13 means the process requests MORP, MVIN, BISR-L(L1-CPB), and WRBK(L1-CPB). Therefore, the subsequent flow is any of the process requests MORP, MVIN, BISR-L(L1-CPB), and WRBK(L1-CPB).

The second cache memory LL, for example, retains the process target data in the Exclusive state or the Modified state thereof (TAGLL: E/M) in the process request WRBK (L1-CPB). The first cache memory L1, of the first cache memories L1 other than the requester, that receives the snoop instruction ISNP retains the process target data in the Exclusive state thereof (other TAGL1c: E).

In this case, the process determining unit MPDJc updates the type code TCLL[1:0], of the type codes TCLL[1:0] retained in the management information retaining unit TAGLL, corresponding to the process target data to "M" (for example, "10"). The process determining unit MPDJc updates the type code TCL1[1:0], of the type codes TCL1[1:0] retained in the management information retaining unit TAGL1c, corresponding to the process target data to "I" (for example, "00"). The process determining unit MPDJc writes data receives from the first cache memory L1 (the first cache memory L1 that receives the snoop instruction ISNP) to the data retaining unit DMEM and reinputs the process request READ that precedes the process request WRBK(L1-CPB).

FIG. 14 illustrates one example of operation of the process determining unit SPDJc illustrated in FIG. 10. That is, FIG. 14 illustrates one example of operation of the process determining unit SPDJc in the sub-pipeline control unit SPLCc. The meanings of the reference signs "M", "E", "S", and "I" illustrated in FIG. 14 are the same as or correspond to those of FIG. 13. Either the process request BISR-L(L1-RPL) or the process request BISR-L(L1-CPB) is performed in the sub-pipeline control unit SPLCc. The management information retaining unit TAGLL is not referenced (TAGLL* in FIG. 14) in the process request BISR-L(L1-RPL) and the process request BISR-L(L1-CPB).

The requester first cache memory L1, for example, retains the process target data in the Shared state or the Exclusive state thereof (requester TAGL1c: S/E) in the process request BISR-L(L1-RPL). In this case, the process determining unit SPDJc does not update and maintains the information retained in the management information retaining unit TAGL1c and ends a series of processes based on the process request BISR-L(L1-RPL) and the preceding process request. The type code TCL1[1:0], of the type codes TCL1[1:0] retained in the management information retaining unit TAGL1c, corresponding to the process target data is previously updated by a process based on the preceding process request (for example, the process request READ(S)). Thus, the management information retaining unit TAGL1c is not updated (-** in FIG. 14) in the process request BISR-L(L1-RPL).

The first cache memories L1 other than the requester, for example, retain the process target data in the Shared state or the Exclusive state thereof (other TAGL1c: S/E) in the process request BISR-L(L1-CPB). In this case, the process determining unit SPDJc updates the type code TCL1[1:0], of the type codes TCL1[1:0] retained in the management information retaining unit TAGL1c, corresponding to the process target data to "I" (for example, "00"). The process determining unit SPDJc reinputs the process request READ that precedes the process request BISR-L(L1-CPB).

Figure 15:
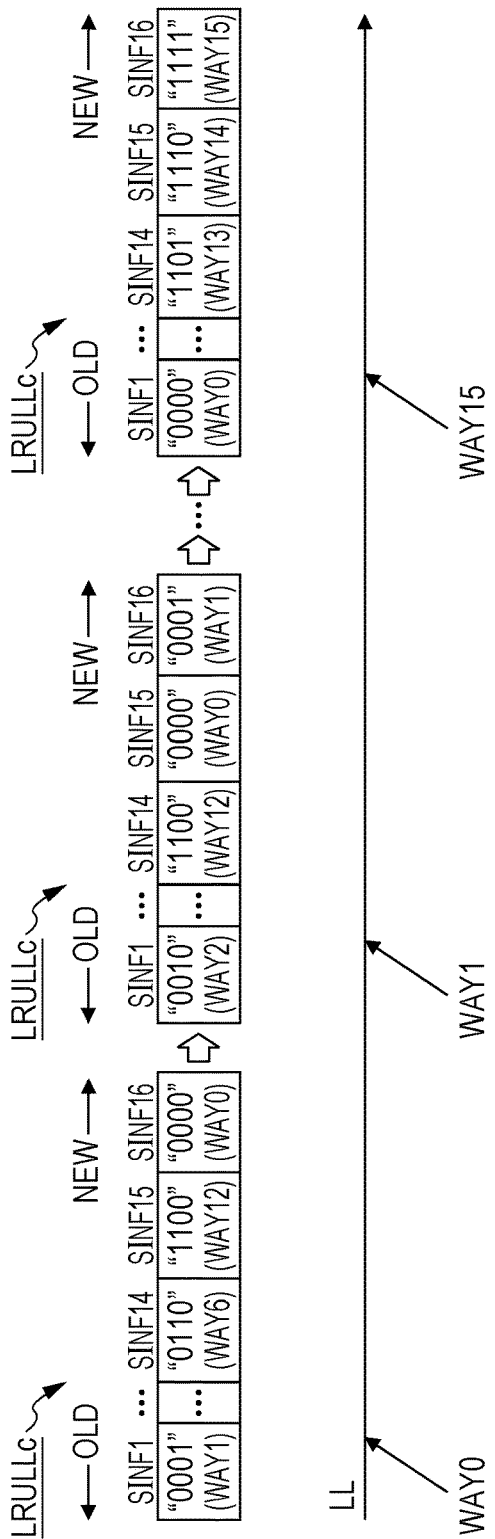
FIG. 15 is a diagram illustrating one example of updating the usage information retaining unit illustrated in FIG. 6.

FIG. 15 illustrates one example of updating the usage information retaining unit LRULLc illustrated in FIG. 6. FIG. 15 illustrates the selection information SINF1 to 5INF16 (SINF1[3:0] to 5INF16[3:0]) of one index address PA[18:7] in the usage information retaining unit LRULLc. The bit value of the selection information illustrated in FIG. 15 corresponds to the number appended to the reference sign of the way WAY. For example, the selection information SINF16 having a bit value of "0000" indicates that the way WAY0 is registered. For example, the selection information SINF15 having a bit value of "1100" indicates that the way WAY12 is registered.

The way WAY that is most recently used is registered in the selection information SINF16 of the selection information SINF1 to SINF16 in the usage information retaining unit LRULLc. For example, the usage information retaining unit LRULLc, each time the way WAY is referenced, shifts to the OLD side of FIG. 15 (left side of FIG. 15) the way WAY that is registered in the selection information SINF having a larger number appended to the reference sign thereof than the selection information SINF in which the referenced way WAY is registered. The usage information retaining unit LRULLc registers the most recently used way WAY (referenced WAY) in the selection information SINF16 (on the rightmost side of FIG. 15).

Figure 16:
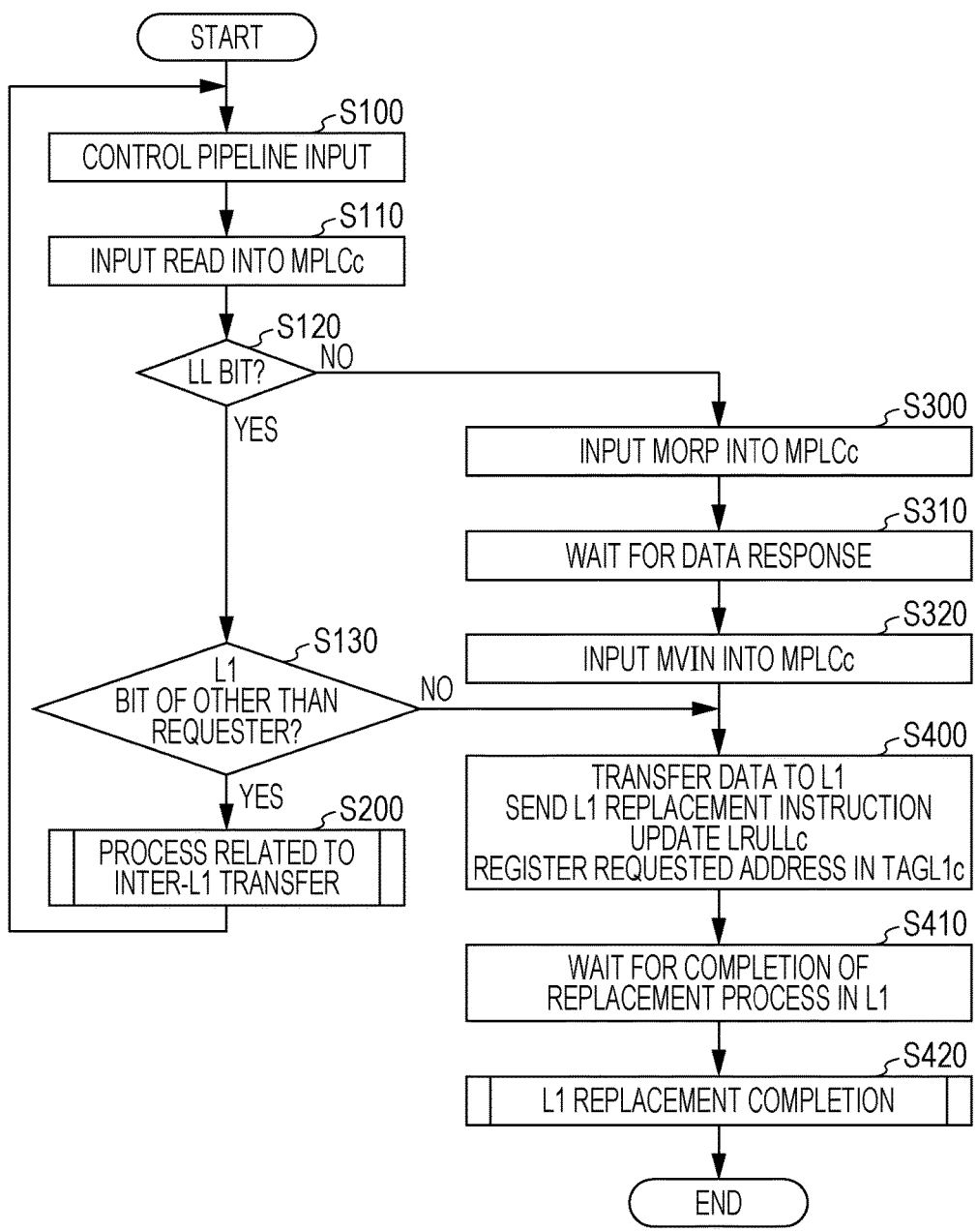
FIG. 16 is a diagram illustrating one example of operation of the operation processing device illustrated in FIG. 3.

FIG. 16 illustrates one example of operation of the operation processing device PU illustrated in FIG. 3. That is, FIG. 16 illustrates one example of the method for controlling the operation processing device PU. FIG. 16 illustrates operation of the second cache memory LL in a case where the second cache memory LL receives the process request READ (read request READ).

In Step S100, the input unit INP performs a pipeline input control such as a process of arbitrating a plurality of process requests and a process of classifying the plurality of process requests into the first type process request and the second type process request, and operation of the input unit INP transitions to Step S110.

In Step S110, the input unit INP inputs the process request READ into the main pipeline control unit MPLCc. Accordingly, the main pipeline control unit MPLCc performs the process of Step S120.

In Step S120, the main pipeline control unit MPLCc references the management information retaining unit TAGLL to determine whether or not a cache hit occurs in the second cache memory LL. For example, the hit determining unit HDJ, as described with FIG. 7 and FIG. 8, references the management information retaining unit TAGLL to determine whether or not a cache hit occurs for the data specified by the requested address RAD[47:0] in the second cache memory LL. The process determining unit MPDJc determines whether or not a cache hit occurs in the second cache memory LL, based on the hit data information HTCLL[1:0] which is the determination result of the hit determining unit HDJ.

The operation of the second cache memory LL transitions to Step S130 in a case where a cache hit occurs in the second cache memory LL. Meanwhile, the operation of the second cache memory LL transitions to Step S300 in a case where a cache hit does not occur in the second cache memory LL (in a case where a cache miss occurs in the second cache memory LL).

In Step S130, the main pipeline control unit MPLCc references the management information retaining unit TAGL1c to determine whether or not a cache hit occurs in any of the first cache memories L1 other than the requester of the process request READ. That is, the main pipeline control unit MPLCc determines whether or not the first cache memories L1 other than the requester of the process request READ retain the data specified by the requested address RAD[47:0].

The core determining unit CDJc, for example, as described with FIG. 7 and FIG. 9, references the management information retaining unit TAGL1c to detect retention of the data specified by the requested address RAD[47:0] in any of the first cache memories L1 other than the requester of the process request READ. The process determining unit MPDJc determines whether or not a cache hit occurs in any of the first cache memories L1 other than the requester of the process request READ, based on the core data information HTC0[1:0] to HTC63[1:0] which is the detection result of the core determining unit CDJc.

The operation of the second cache memory LL transitions to Step S200 in a case where a cache hit occurs in any of the first cache memories L1 other than the requester of the process request READ. That is, the operation of the second cache memory LL transitions to Step S200 in a case where the first cache memories L1 other than the requester of the process request READ retain the data specified by the requested address RAD[47:0].

Meanwhile, the operation of the second cache memory LL transitions to Step S400 in a case where a cache hit does not occur in any of the first cache memories L1 other than the requester of the process request READ (in a case where a cache miss occurs in all of the first cache memories L1 other than the requester). That is, the operation of the second cache memory LL transitions to Step S400 in a case where none of the first cache memories L1 other than the requester of the process request READ retain the data specified by the requested address RAD[47:0].

In Step S200, the second cache memory LL performs a process related to the inter-L1 transfer. Accordingly, the data specified by the requested address RAD[47:0] is evicted from the first cache memories L1 other than the requester. Details of the process related to the inter-L1 transfer will be described with FIG. 17.

Figure 17:
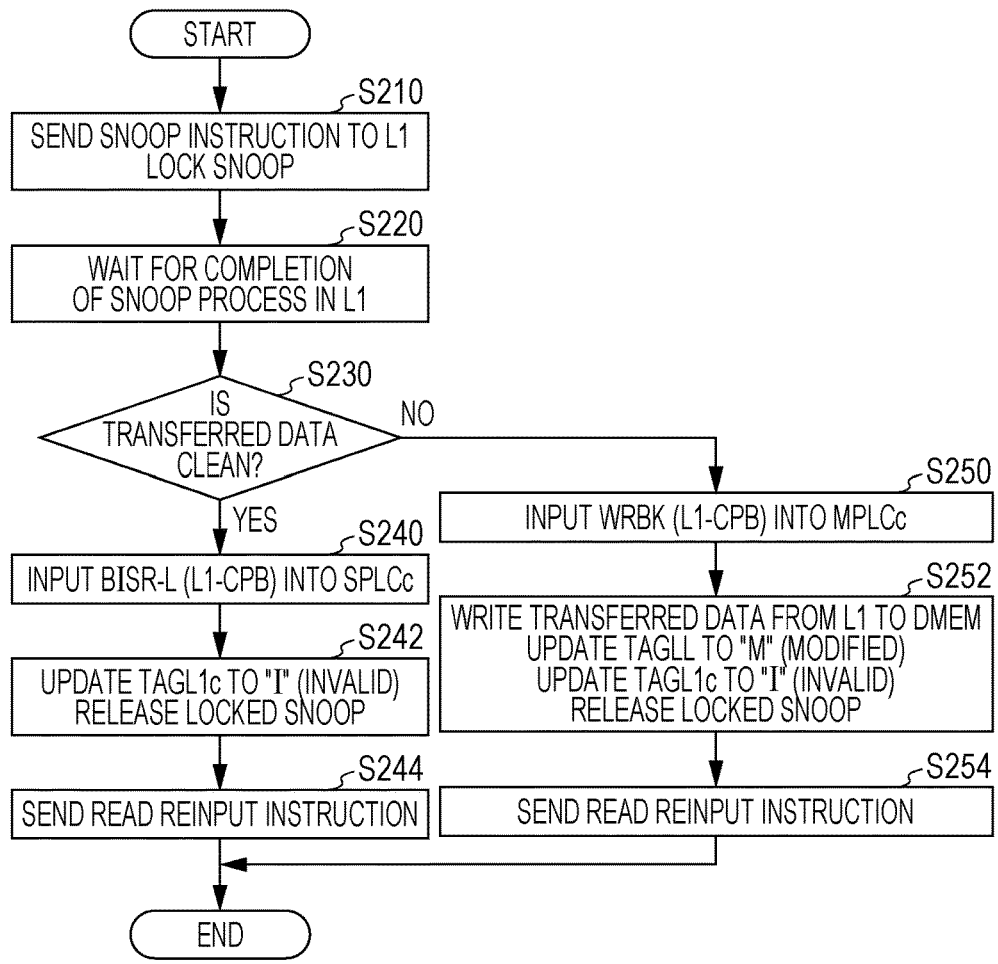
FIG. 17 is a diagram illustrating one example of a process related to inter-L1 transfer illustrated in FIG. 16.

The sub-pipeline control unit SPLCc or the main pipeline control unit MPLCc, in the process related to the inter-L1 transfer, notifies the input unit INP of a process request READ reinput instruction in Step S244 or Step S254 illustrated in FIG. 17. The operation of the second cache memory LL returns to Step S100 after the sub-pipeline control unit SPLCc or the main pipeline control unit MPLCc notifies the input unit INP of the process request READ reinput instruction.

In Step S300, the input unit INP inputs the process request MORP into the main pipeline control unit MPLCc. Accordingly, the main pipeline control unit MPLCc performs the replacement to evict data from the second cache memory LL. The operation of the second cache memory LL transitions to Step S310 after the process request MORP is input into the main pipeline control unit MPLCc.

In Step S310, the second cache memory LL waits for the completion of the replacement and a data response from the external device such as the main memory device that retains the data specified by the requested address RAD[47:0], and the operation of the second cache memory LL transitions to Step S320 after the second cache memory LL receives a data response and the like.

In Step S320, the input unit INP inputs the process request MVIN into the main pipeline control unit MPLCc. Accordingly, the main pipeline control unit MPLCc performs a process of registering the data specified by the requested address RAD[47:0] in the second cache memory LL. The operation of the second cache memory LL transitions to Step S400 after the data specified by the requested address RAD[47:0] is registered.

In Step S400, the main pipeline control unit MPLCc transfers the data specified by the requested address RAD [47:0] to the requester first cache memory L1 and notifies the requester first cache memory L1 of the replacement instruction. The main pipeline control unit MPLCc updates the information retained in the usage information retaining unit LRULLc and the management information retaining unit TAGL1c.

The main pipeline control unit MPLCc, for example, updates the first management information INFL1c, of the first management information INFL1c0 to INFL1c63 specified by the requested address RAD[13:7], that is specified by the requested way information REQCWAY. Accordingly, the way information WAYLL[3:0] based on the requested address RAD[47:0], the difference information PA[18:14], and the type code TCL1[1:0] are registered in the management information retaining unit TAGL1c. The operation of the second cache memory LL transitions to Step S410 after the process of Step S400 is performed.

In Step S410, the second cache memory LL waits for the completion of the replacement in the first cache memory L1, and the operation of the second cache memory LL transitions to Step S420 after the replacement in the first cache memory L1 is completed.

In Step S420, the second cache memory LL performs L1 replacement completion. The L1 replacement completion is a process that is accompanied by the completion of the replacement in the first cache memory L1 and performed by the second cache memory LL. A series of processes accompanied by the process request READ is ended by the end of the L1 replacement completion. Details of the L1 replacement completion will be described with FIG. 18.

FIG. 17 illustrates one example of the process related to the inter-L1 transfer (the process of Step S200) illustrated in FIG. 16. The first cache memory L1, of the first cache memories L1 other than the requester of the process request READ, that retains the transferred data specified by the requested address RAD[47:0] will be referred to as the transferrer first cache memory L1 in FIG. 17 and the subsequent drawings.

In Step S210, the main pipeline control unit MPLCc notifies the transferrer first cache memory L1 of the snoop instruction ISNP and outputs to the snoop lock unit SNP an instruction to perform a snoop lock of the transferrer first cache memory L1. Hereinafter, the instruction to perform a snoop lock will be referred to as a snoop lock instruction.

Next, in Step S220, the second cache memory LL waits for the completion of the snoop in the first cache memory L1, and the operation of the second cache memory LL transitions to Step S230 after the snoop in the first cache memory L1 is completed.

In Step S230, the second cache memory LL determines whether or not the transferred data is clean. For example, the transferrer first cache memory L1 outputs to the second cache memory LL, as a result of the snoop, a process result that indicates whether or not the transferred data is clean. The second cache memory LL determines whether or not the transferred data is clean based on the process result received from the first cache memory L1.

The operation of the second cache memory LL transitions to Step S240 in a case where the transferred data is clean. Meanwhile, the operation of the second cache memory LL transitions to Step S250 in a case where the transferred data is not clean (in a case where the transferred data is dirty).

In Step S240, the input unit INP inputs the process request BISR-L(L1-CPB) into the sub-pipeline control unit SPLCc. The sub-pipeline control unit SPLCc that receives the process request BISR-L(L1-CPB) performs the process of Step S242.

In Step S242, the sub-pipeline control unit SPLCc updates the type code TCL1 in the first management information INFL1c retained in the management information retaining unit TAGL1c to "I" (Invalid) and outputs to the snoop lock unit SNP an instruction to release a snoop lock. Hereinafter, the instruction to release a snoop lock will be referred to as a snoop lock release instruction.

The first management information INFL1c that is updated in Step S242 is the first management information INFL1c, of the first management information inFL1c corresponding to the ways of the transferrer first cache memory L1 that retains the transferred data, that is specified by the requested address RAD[13:7]. The operation of the second cache memory LL transitions to Step S244 after the process of Step S242 is performed.

In Step S244, the sub-pipeline control unit SPLCc outputs the process request READ reinput instruction to the input unit INP and ends the process related to the inter-L1 transfer. Accordingly, the input unit INP performs the process of Step S100 illustrated in FIG. 16 and reinputs the process request READ into the main pipeline control unit MPLCc in Step S110.

In Step S250, the input unit INP inputs the process request WRBK(L1-CPB) into the main pipeline control unit MPLCc. The main pipeline control unit MPLCc that receives the process request WRBK(L1-CPB) performs the process of Step S252.

In Step S252, the main pipeline control unit MPLCc writes to the data retaining unit DMEM the transferred data transferred from the first cache memory L1. The main pipeline control unit MPLCc updates the type code TCLL in the second management information INFLL retained in the management information retaining unit TAGLL to "M" (Modified). Accordingly, the second management information INFLL, of the second management information INFLL0 to INFLL15 specified by the requested address RAD[18:7], that includes the tag address PA[47:19] matching the requested address RAD[47:19] is updated.

The main pipeline control unit MPLCc updates the type code TCL1 in the first management information INFL1c retained in the management information retaining unit TAGL1c to "I" (Invalid) and outputs to the snoop lock unit SNP the snoop lock release instruction.

The first management information INFL1c that is updated in Step S252 is the first management information INFL1c, of the first management information inFL1c corresponding to the ways of the transferrer first cache memory L1 that retains the transferred data, that is specified by the requested address RAD[13:7]. The operation of the second cache memory LL transitions to Step S254 after the process of Step S252 is performed.

In Step S254, the main pipeline control unit MPLCc outputs the process request READ reinput instruction to the input unit INP and ends the process related to the inter-L1 transfer. Accordingly, the input unit INP performs the process of Step S100 illustrated in FIG. 16 and reinputs the process request READ into the main pipeline control unit MPLCc in Step S110.

Figure 18:
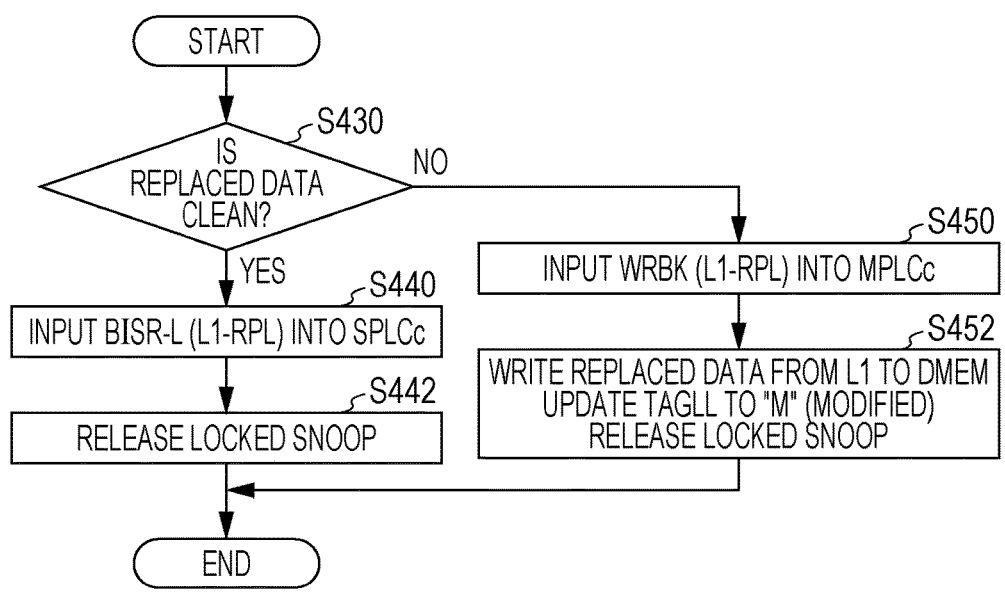
FIG. 18 is a diagram illustrating one example of L1 replacement completion illustrated in FIG. 16.

FIG. 18 illustrates one example of the L1 replacement completion (the process of Step S420) illustrated in FIG. 16.

In Step S430, the second cache memory LL determines whether or not the replaced data evicted from the first cache memory L1 by the replacement in the first cache memory L1 is clean. For example, the first cache memory L1 which is the requester of the process request READ outputs to the second cache memory LL, as a result of the replacement, a process result that indicates whether or not the replaced data is clean. The second cache memory LL determines whether or not the replaced data is clean based on the process result received from the first cache memory L1.

The operation of the second cache memory LL transitions to Step S440 in a case where the replaced data is clean. Meanwhile, the operation of the second cache memory LL transitions to Step S450 in a case where the replaced data is not clean (in a case where the replaced data is dirty).

In Step S440, the input unit INP inputs the process request BISR-L(L1-RPL) into the sub-pipeline control unit SPLCc. The sub-pipeline control unit SPLCc that receives the process request BISR-L(L1-RPL) performs the process of Step S442.

In Step S442, the sub-pipeline control unit SPLCc outputs the snoop lock release instruction to the snoop lock unit SNP and ends the L1 replacement completion.

In Step S450, the input unit INP inputs the process request WRBK(L1-RPL) into the main pipeline control unit MPLCc. The main pipeline control unit MPLCc that receives the process request WRBK(L1-RPL) performs the process of Step S452.

In Step S452, the main pipeline control unit MPLCc writes to the data retaining unit DMEM the replaced data transferred from the first cache memory L1. The main pipeline control unit MPLCc updates the type code TCLL in the second management information INFLL retained in the management information retaining unit TAGLL to "M" (Modified). Accordingly, the second management information INFLL, of the second management information INFLL0 to INFLL15 specified by the requested address RAD[18:7], that includes the tag address PA[47:19] matching the requested address RAD[47:19] is updated.

The main pipeline control unit MPLCc outputs the snoop lock release instruction to the snoop lock unit SNP and ends the L1 replacement completion. The operation of the operation processing device PU is not limited to the example illustrated in FIG. 16 to FIG. 18.

Figure 19:
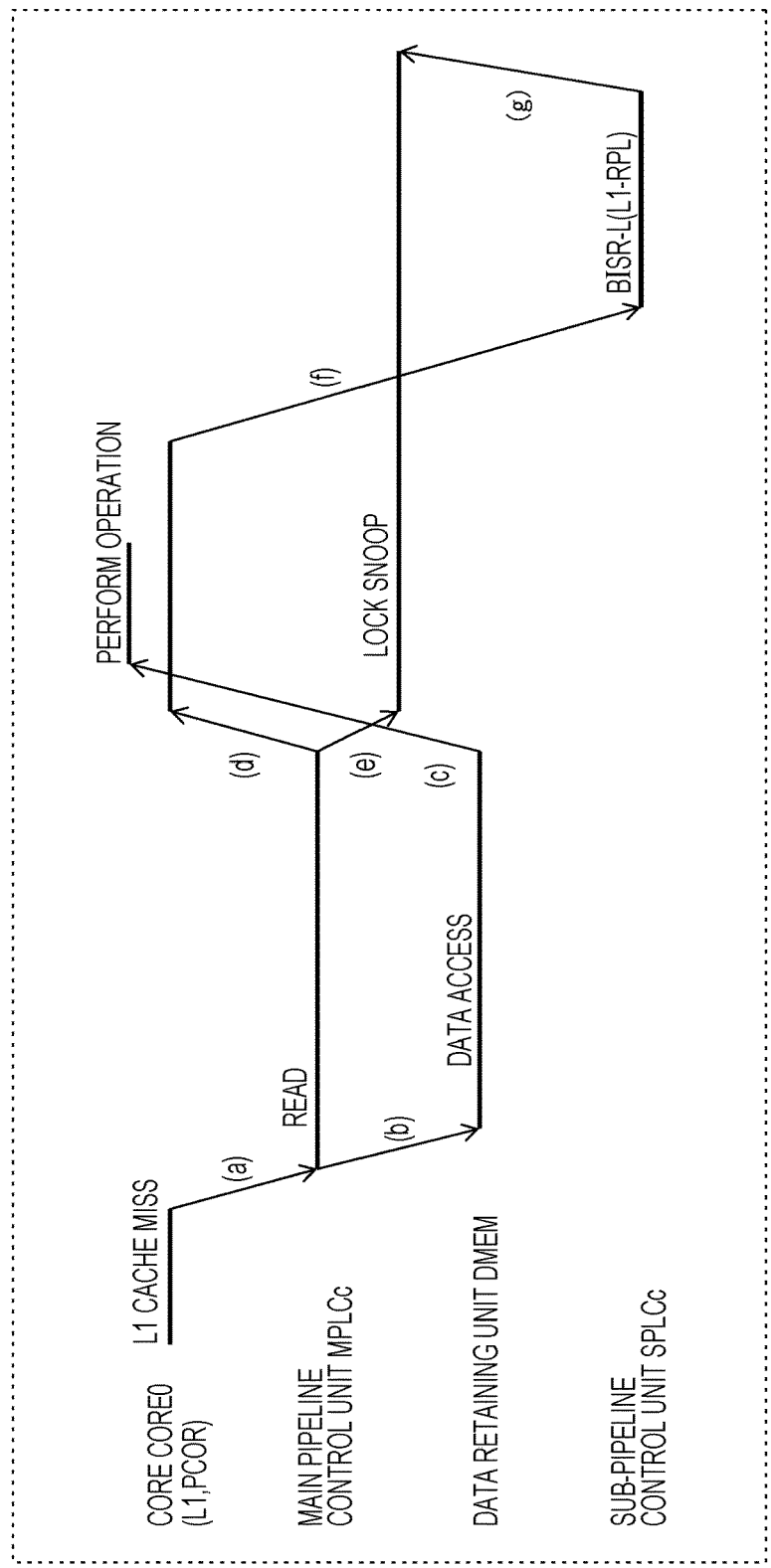
FIG. 19 is a diagram illustrating one example of operation of the operation processing device in a case where replaced data is clean.

FIG. 19 illustrates one example of operation of the operation processing device PU in a case where the replaced data is clean.

The core CORE0 transfers the process request READ and the requested address RAD to the main pipeline control unit MPLCc through the input unit INP since a cache miss occurs in the first cache memory L1 ((a) in FIG. 19).

The main pipeline control unit MPLCc searches for the second management information INFLL corresponding to the requested address RAD in the management information retaining unit TAGLL and searches for the first management information INFL1c corresponding to the requested address RAD in the management information retaining unit TAGL1c.

A hit occurs in the management information retaining unit TAGLL, and a miss occurs in the management information retaining unit TAGL1c in the example illustrated in FIG. 19. That is, the requested data specified by the requested address RAD is retained in the second cache memory LL and is not retained in any of the first cache memories L1 of the plurality of cores CORE. In this case, the main pipeline control unit MPLCc accesses the data retaining unit DMEM and reads the requested data ((b) in FIG. 19).

The main pipeline control unit MPLCc transfers the requested data read from the data retaining unit DMEM to the core CORE0 ((c) in FIG. 19). The processor core PCOR in the core CORE0 uses the requested data transferred from the second cache memory LL to perform operations and the like.

The main pipeline control unit MPLCc performs an update of the information retained in the management information retaining units TAGLL and TAGL1c (an update by overwriting based on the process request READ). The main pipeline control unit MPLCc outputs a data response command and the replacement instruction IRPL to the core CORE0 which is the requester of the process request READ ((d) in FIG. 19). The main pipeline control unit MPLCc outputs to the snoop lock unit SNP an instruction to perform a snoop lock of the core CORE0 ((e) in FIG. 19).

The core CORE0 transfers the process request BISR-L(L1-RPL) to the sub-pipeline control unit SPLCc through the input unit INP in a case where registration of the requested data and the replacement are completed in the first cache memory L1 ((f) in FIG. 19). Since the replaced data evicted by the replacement from the first cache memory L1 is clean in the example illustrated in FIG. 19, the process request BISR-L(L1-RPL) is transferred to the sub-pipeline control unit SPLCc.

The second management information INFLL retained in the management information retaining unit TAGLL does not include information related to the state of the first cache memory L1 and thus is not updated. The first management information INFL1c is not updated in the process request BISR-L(L1-RPL) since the first management information INFL1c retained in the management information retaining unit TAGL1c is previously updated by a process based on the process request READ. Thus, the sub-pipeline control unit SPLCc outputs to the snoop lock unit SNP an instruction to release the snoop lock of the core CORE0 ((g) in FIG. 19) and ends the process based on the process request BISR-L(L1-RPL).

The process request BISR-L(L1-RPL) is not input into the main pipeline control unit MPLCc. Thus, the process request READ may be input into the main pipeline control unit MPLCc in a cycle in which the process request BISR-L(L1-RPL) is input into the sub-pipeline control unit SPLCc. Accordingly, the process request READ may be input into the main pipeline control unit MPLCc in each cycle.

Figure 20:
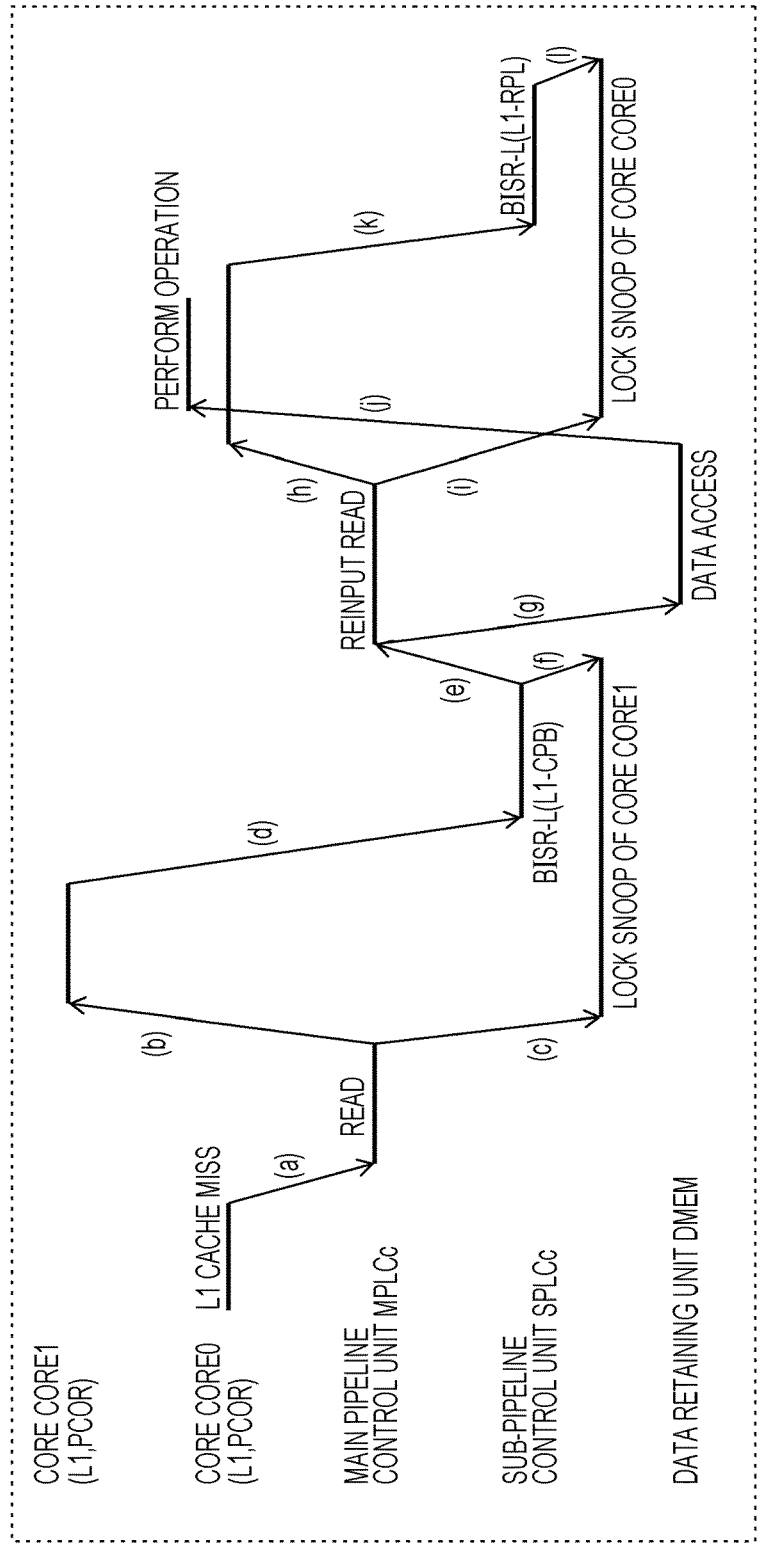
FIG. 20 is a diagram illustrating one example of operation of the operation processing device during the inter-L1 transfer.

FIG. 20 illustrates one example of operation of the operation processing device PU during the inter-L1 transfer. FIG. 20 illustrates one example of operation of the operation processing device PU during the inter-L1 transfer in which data is transferred from the first cache memory L1 in the core CORE1 to the first cache memory L1 in the core CORE0. The transferred data retained in the first cache memory L1 in the core CORE1 is clean in the example illustrated in FIG. 20.

The core CORE0 transfers the process request READ and the requested address RAD to the main pipeline control unit MPLCc through the input unit INP since a cache miss occurs in the first cache memory L1 ((a) in FIG. 20).

The main pipeline control unit MPLCc searches for the second management information INFLL corresponding to the requested address RAD in the management information retaining unit TAGLL and searches for the first management information INFL1c corresponding to the requested address RAD in the management information retaining unit TAGL1c.

A hit occurs in the management information retaining unit TAGLL, and a hit occurs for the first management information INFL1c corresponding to the core CORE1 in the management information retaining unit TAGL1c in the example illustrated in FIG. 20. The type code TCL1c in the first management information INFL1c for which a hit occurs indicates the Exclusive state. That is, the requested data specified by the requested address RAD is retained in the second cache memory LL and is retained in the Exclusive state thereof in the first cache memory L1 of the core CORE1. In this case, the main pipeline control unit MPLCc outputs the snoop instruction ISNP to the core CORE1 ((b) in FIG. 20). The main pipeline control unit MPLCc outputs to the snoop lock unit SNP an instruction to perform a snoop lock of the core CORE1 ((c) in FIG. 20).

The core CORE1, since the transferred data is clean, transfers the process request BISR-L(L1-CPB) to the sub-pipeline control unit SPLCc through the input unit INP in a case where the snoop is completed ((d) in FIG. 20). The sub-pipeline control unit SPLCc updates the type code TCL1c in the first management information INFL1c, of the first management information INFL1c retained in the management information retaining unit TAGL1c, of the transferred data retained in the first cache memory L1 of the core CORE1 to Invalid.

The sub-pipeline control unit SPLCc outputs the process request READ reinput instruction to the input unit INP after the type code TCL1c in the first management information INFL1c of the transferred data is updated to Invalid ((e) in FIG. 20). The sub-pipeline control unit SPLCc outputs to the snoop lock unit SNP an instruction to release the snoop lock of the core CORE1 ((f) in FIG. 20). The operation of the core CORE1 after the snoop lock thereof is released is the same as or corresponds to the operation illustrated in FIG. 19.

Figure 21:
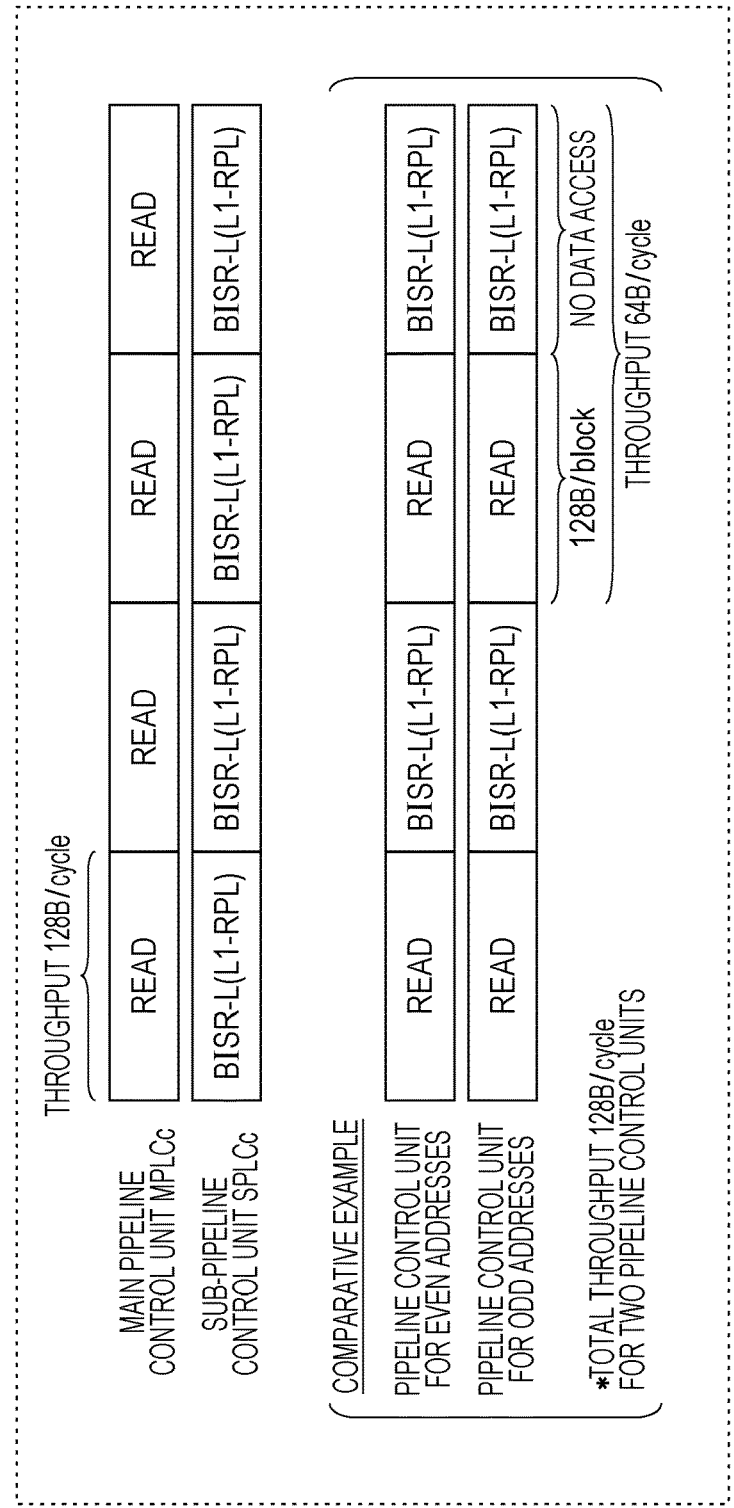
FIG. 21 is a diagram illustrating one example of operation of the pipeline control units in a case where cache misses consecutively occur in a first cache memory illustrated in FIG. 3.

FIG. 21 illustrates one example of operation of the pipeline control units in a case where cache misses consecutively occur in the first cache memory L1 illustrated in FIG. 3. All the replaced data evicted from the first cache memory L1 is clean in the example illustrated in FIG. 21. The upper limit of the amount of data transfer in one cycle will be described as 128 bytes in FIG. 21.

Both the process request READ and the process request BISR-L(L1-RPL) may be input in each cycle since the sub-pipeline control unit SPLCc dedicated to the process request BISR-L is provided in the second cache memory LL. For example, the process request READ is input into the main pipeline control unit MPLCc in each cycle, and the process request BISR-L(L1-RPL) is input into the sub-pipeline control unit SPLCc in each cycle. A throughput of 128 bytes/cycle may be realized since all cycles generated accompany data access in control terms.

Two pipeline control units for even addresses and odd addresses, for example, are provided in a comparative example that does not include the sub-pipeline control unit SPLCc, in order to realize a throughput of 128 bytes/cycle. The process request READ and the process request BISR-L(L1-RPL) are alternately input into each pipeline control unit of the comparative example, and thus cycles that does not accompany data access are generated. For example, data is transferred at 128 bytes/block in a process based on the process request READ. In this case, the throughput of one pipeline control unit is 64 bytes/cycle. Thus, the comparative example realizes a total throughput of 128 bytes/cycle for two pipeline control units.

The circuit size of a cache memory that includes two pipeline control units is increased compared with the second cache memory LL since the two pipeline control units perform the same or corresponding process in the comparative example. That is, the second cache memory LL uses the main pipeline control unit MPLCc and the sub-pipeline control unit SPLCc which has a smaller circuit size than the main pipeline control unit MPLCc, and thereby the throughput may be improved while an increase in the circuit size is reduced.

The embodiment heretofore illustrated in FIG. 3 to FIG. 21 may achieve the same effect as the embodiment illustrated in FIG. 1 and FIG. 2. For example, the second cache memory LL may perform a process based on the first type process request (for example, completion of the replacement that does not accompany a write-back) in parallel with a process based on the second type process request such as a read request. Accordingly, the throughput of the second cache memory LL may be improved while an increase in the circuit size is reduced, compared with a technique that may not perform a process based on the first type process request in parallel with a process based on the second type process request (for example, the comparative example illustrated in FIG. 21).

Figure 22:
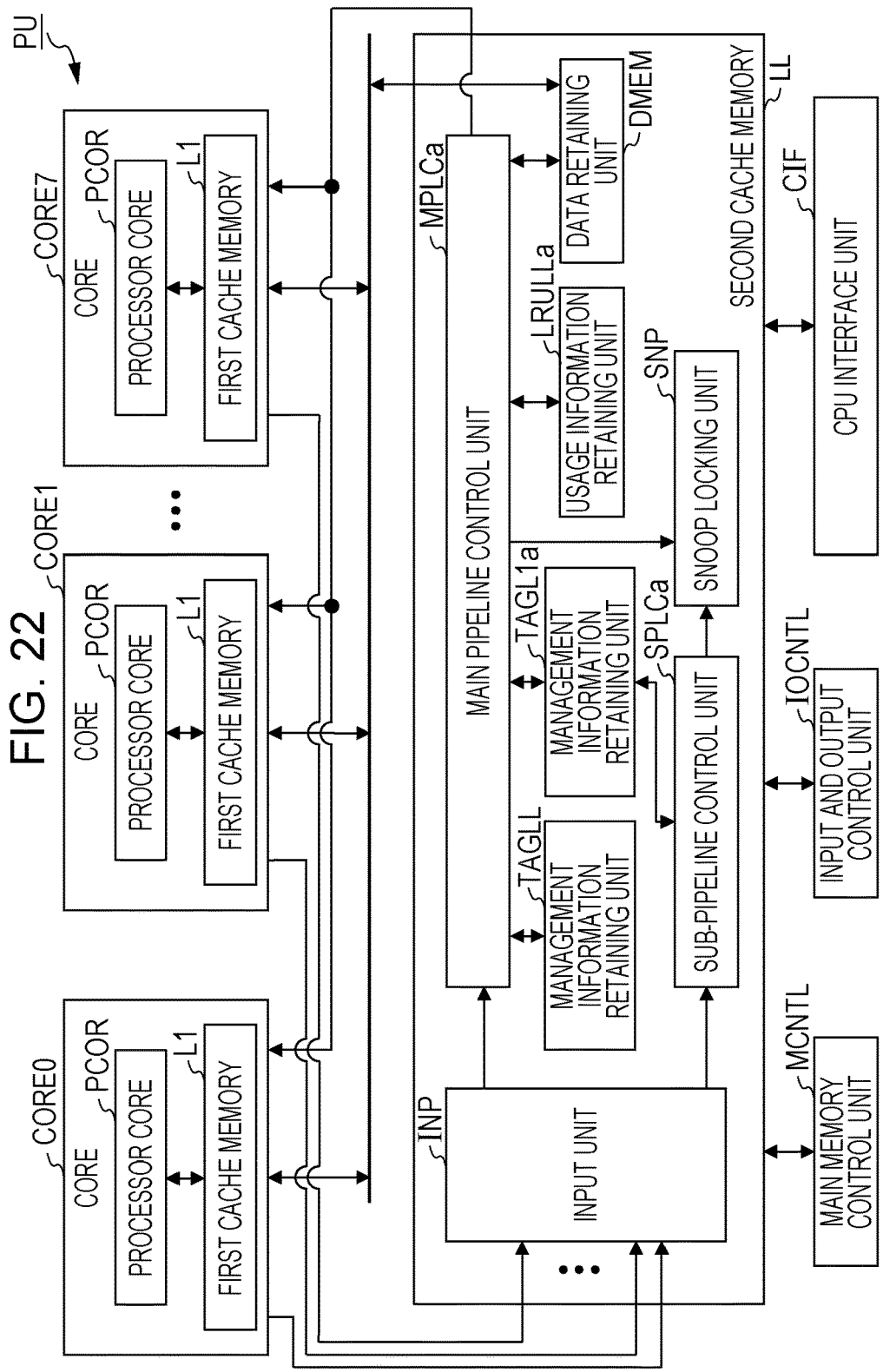
FIG. 22 is a diagram illustrating still another embodiment of the operation processing device and the method for controlling the operation processing device.

FIG. 22 is a diagram illustrating still another embodiment of the operation processing device and the method for controlling the operation processing device. The same or corresponding constituents as those described with FIG. 1 to FIG. 21 will be designated by the same or corresponding reference signs and will not be described in detail. The operation processing device PU illustrated in FIG. 22 is a processor such as a CPU that executes instructions.

The operation processing device PU includes the plurality of cores CORE (CORE0, CORE1, . . . , CORE7), the second cache memory LL, the main memory control unit MCNTL, the input and output control unit IOCNTL, and the CPU interface unit CIF. The cores CORE, the main memory control unit MCNTL, the input and output control unit IOCNTL, and the CPU interface unit CIF are the same as or correspond to the cores CORE, the main memory control unit MCNTL, the input and output control unit IOCNTL, and the CPU interface unit CIF illustrated in FIG. 3. For example, each core CORE includes the processor core PCOR and the first cache memory L1 that is accessible at a higher speed than the second cache memory LL.

The second cache memory LL is a secondary cache memory of a lower level than the first cache memory L1 and is shared by the plurality of cores CORE. The second cache memory LL includes, for example, the data retaining unit DMEM, a management information retaining unit TAGL1a, the management information retaining unit TAGLL, and a usage information retaining unit LRULLa. The second cache memory LL includes the input unit INP, a main pipeline control unit MPLCa, a sub-pipeline control unit SPLCa, and the snoop lock unit SNP.

The data retaining unit DMEM, the management information retaining unit TAGLL, the input unit INP, and the snoop lock unit SNP are the same as or correspond to the data retaining unit DMEM, the management information retaining unit TAGLL, the input unit INP, and the snoop lock unit SNP illustrated in FIG. 3. The usage information retaining unit LRULLa is the same as or corresponds to the usage information retaining unit LRULLc illustrated in FIG. 6 except that the selecting unit SLU illustrated in FIG. 6 is removed from the usage information retaining unit LRULLc. Details of the management information retaining unit TAGL1a and the main pipeline control unit MPLCa will be described with FIG. 23. Details of the sub-pipeline control unit SPLCa will be described with FIG. 25.

FIG. 23 is a diagram illustrating one example of the main pipeline control unit MPLCa illustrated in FIG. 22. Dot-dashed lines illustrated in FIG. 23 correspond to boundaries between each stage of a pipeline process. The management information retaining unit TAGL1a illustrated in FIG. 23 is the same as or corresponds to the management information retaining unit TAGL1c illustrated in FIG. 5 except that the management information retaining unit TAGL1a retains the first management information INFL1a instead of the first management information INFL1c illustrated in FIG. 5. Each first management information INFL1a includes the tag address PA[47:14] of the first cache memory L1 instead of the way information WAYLL[3:0] and the difference information PA[18:14] illustrated in FIG. 5. The tag address PA[47:14] of the first cache memory L1 is represented by a bit group corresponding to a part (from the bit number 14 to the bit number 47) of the memory address RAD[47:0]. That is, each first management information INFL1a includes the tag address PA[47:14] and the type code TCL1[1:0].

The main pipeline control unit MPLCa includes a core determining unit CDJa and a process determining unit MPDJa instead of the core determining unit CDJc and the process determining unit MPDJc illustrated in FIG. 7. Other configurations of the main pipeline control unit MPLCa are the same as or correspond to those of the main pipeline control unit MPLCc illustrated in FIG. 7. For example, the main pipeline control unit MPLCa includes the hit determining unit HDJ, the core determining unit CDJa, and the process determining unit MPDJa.

The core determining unit CDJa determines whether or not a cache hit occurs in any of the plurality of first cache memories L1. For example, the core determining unit CDJa receives the first management information INFL1a0 to INFL1a63 specified by the index address RAD[13:7] from the management information retaining unit TAGL1a. The core determining unit CDJa receives from the input unit INP the address RAD[47:14] and the requested way information REQCWAY that indicates the number and the like of the way of the first cache memory L1 in which the replaced data to be evicted from the first cache memory L1 is retained.

The core determining unit CDJa, for example, generates the requested data information RTCL1[1:0] using the requested way information REQCWAY and the type code TCL1[1:0] in each first management information INFL1a. The core determining unit CDJa generates the core data information HTC0[1:0] to HTC63[1:0] using the address RAD[47:14] and each first management information INFL1a. The number appended to the reference sign of the core data information HTC corresponds to the number appended to the reference sign of the first management information INFL1a. The meaning of the number appended to the reference sign of the first management information INFL1a is the same as the meaning of the number appended to the reference sign of the first management information INFL1c illustrated in FIG. 5.

The core determining unit CDJa, for example, compares the address RAD[47:14] with the tag address PA[47:14] in each first management information INFL1a received from the management information retaining unit TAGL1a. The core determining unit CDJa determines a cache hit to occur in any of the first cache memories L1 in a case where any tag address PA[47:14] in the first management information INFL1a received from the management information retaining unit TAGL1a matches the address RAD[47:14].

The core data information HTC0[1:0] to HTC63[1:0], as described with FIG. 3, indicates the state of data (data retained in the first cache memory L1) for which a cache hit occurs in the first cache memory L1. The core data information HTC0[1:0] to HTC63[1:0] corresponding to data for which a cache miss occurs is set to, for example, "00".

The requested data information RTCL1[1:0], as described with FIG. 3, indicates the state of data, of the data specified by the address RAD[13:7], that is retained in the way of the first cache memory L1 specified by the requested way information REQCWAY. Details of the core determining unit CDJa will be described with FIG. 24.

The process determining unit MPDJa is the same as or corresponds to the process determining unit MPDJc illustrated in FIG. 3 except that the process determining unit MPDJa updates the selection information SINF retained in the usage information retaining unit LRULLa instead of the usage information retaining unit LRULLc illustrated in FIG. 6. For example, the process determining unit MPDJa receives the hit data information HTCLL[1:0] from the hit determining unit HDJ and receives the core data information HTC0[1:0] to HTC63[1:0] and the requested data information RTCL1[1:0] from the core determining unit CDJa. The process determining unit MPDJa receives the process information PID[3:0] and the operation information OPCD[1:0] from the input unit INP.

The process determining unit MPDJa, for example, outputs the update instruction UPDLL to the management information retaining unit TAGLL and outputs an update instruction UPDL1a to the management information retaining unit TAGL1a. The process determining unit MPDJa outputs the update instruction UPDLRU to the usage information retaining unit LRULLa.

Figure 24:
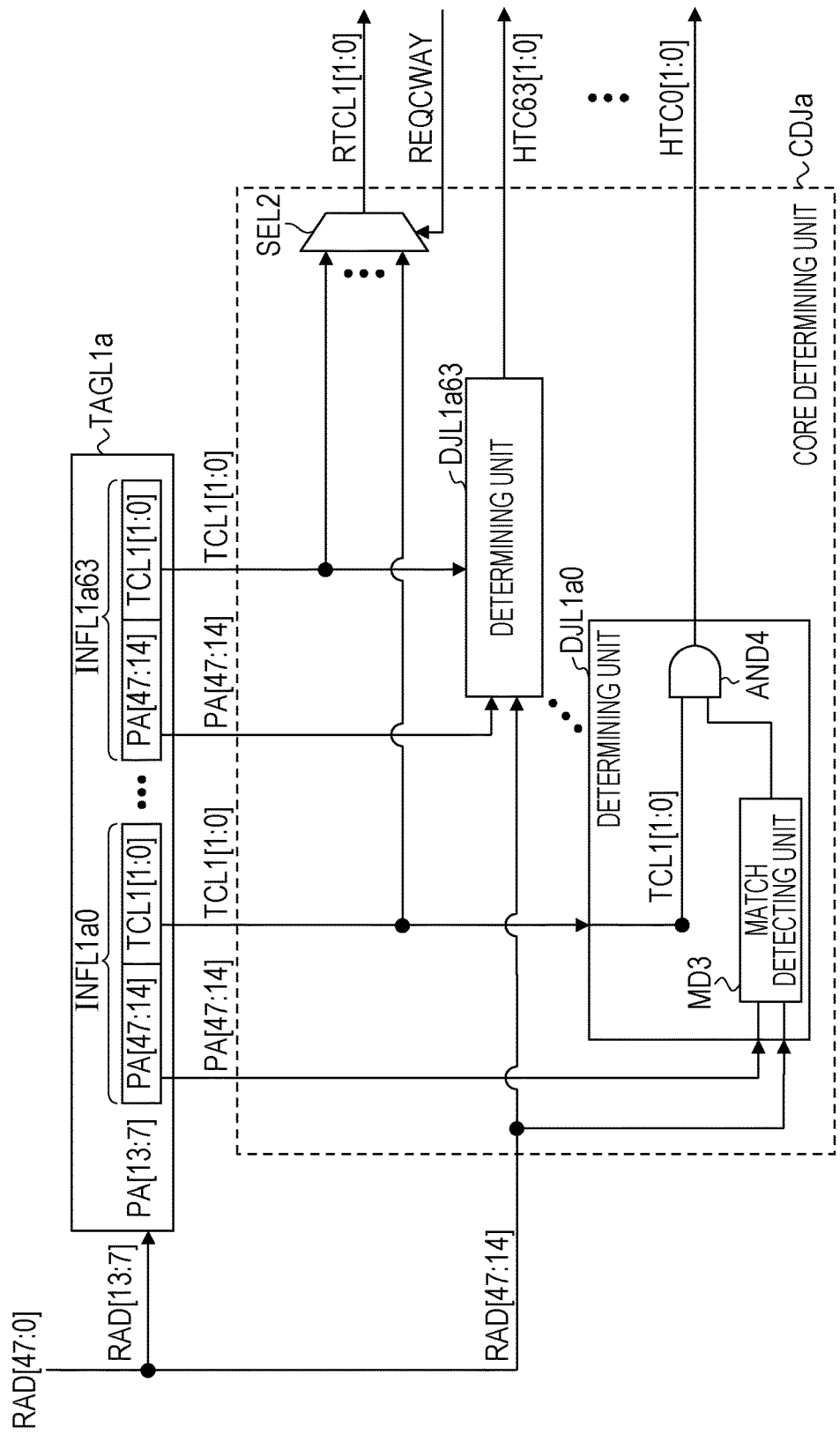
FIG. 24 is a diagram illustrating one example of a core determining unit illustrated in FIG. 23.

FIG. 24 illustrates one example of the core determining unit CDJa illustrated in FIG. 23. The core determining unit CDJa includes a plurality of determining units DJLa (DJL1a0 to DJL1a63) and the selecting unit SEL2. The number appended to the reference sign of the determining unit DJL1a corresponds to the number appended to the reference sign of the first management information INFL1a. The plurality of determining units DJL1a is the same or corresponds to each other, and thus the determining unit DJ1a0 will be described.

The determining unit DJ1a0 includes a match detecting unit MD3 and a logical product circuit AND4. The match detecting unit MD3 receives from the management information retaining unit TAGL1a the tag address PA[47:14] in the first management information INFL1a0 corresponding to the index address PA[13:7] specified by the address RAD [13:7]. The match detecting unit MD3 compares the address RAD[47:14] received from the input unit INP with the tag address PA[47:14] in the first management information INFL1a0 and outputs the comparison result to the logical product circuit AND4. The match detecting unit MD3, for example, outputs information indicating truth (for example, the logical value "1") as the comparison result to the logical product circuit AND4 in a case where the address RAD[47: 14] matches the tag address PA[47:14]. The match detecting unit MD3 outputs information indicating falsity (for example, the logical value "0") as the comparison result to the logical product circuit AND4 in a case where the address RAD[47:14] does not match the tag address PA[47:14].

The logical product circuit AND4 receives from the management information retaining unit TAGL1a the type code TCL1[1:0] in the first management information INFL1a0 corresponding to the index address PA[13:7] specified by the address RAD[13:7].

The logical product circuit AND4 performs an operation to calculate the logical product of the comparison result of the match detecting unit MD3 and the type code TCL1[1:0] received from the management information retaining unit TAGL1a and outputs the operation result as the core data information HTC0[1:0]. The comparison result of the match detecting unit MD3 is true (equal to, for example, the logical value "1") in a case where, for example, the access target data is retained in the zeroth way in the first cache memory L1 of the core CORE0. In this case, the determining unit DJL1a0 outputs the type code TCL1[1:0], which is received from the management information retaining unit TAGL1a, as the core data information HTC0[1:0] to the process determining unit MPDJa.

The selecting unit SEL2 is the same as or corresponds to the selecting unit SEL2 illustrated in FIG. 9. For example, the selecting unit SEL2 transfers, as the requested data information RTCL1[1:0], the type code TCL1[1:0] specified by the requested way information REQCWAY to the process determining unit MPDJa.

The core determining unit CDJa does not generate the possession information CINF0 to CINF15 illustrated in FIG. 9 and the like since the first management information INFL1a does not include the way information WAYLL[3:0] illustrated in FIG. 5 and the like. Thus, the operation processing device PU illustrated in FIG. 22 does not perform the process of excluding the way WAY of the second cache memory LL retaining the data retained in the first cache memory L1 from the replacement target. In other words, using the management information retaining unit TAGL1c that retains the first management information INFL1c including the way information WAYLL[3:0] allows a decrease in the frequency of cache hits to be reduced as described with FIG. 6.

Figure 25:
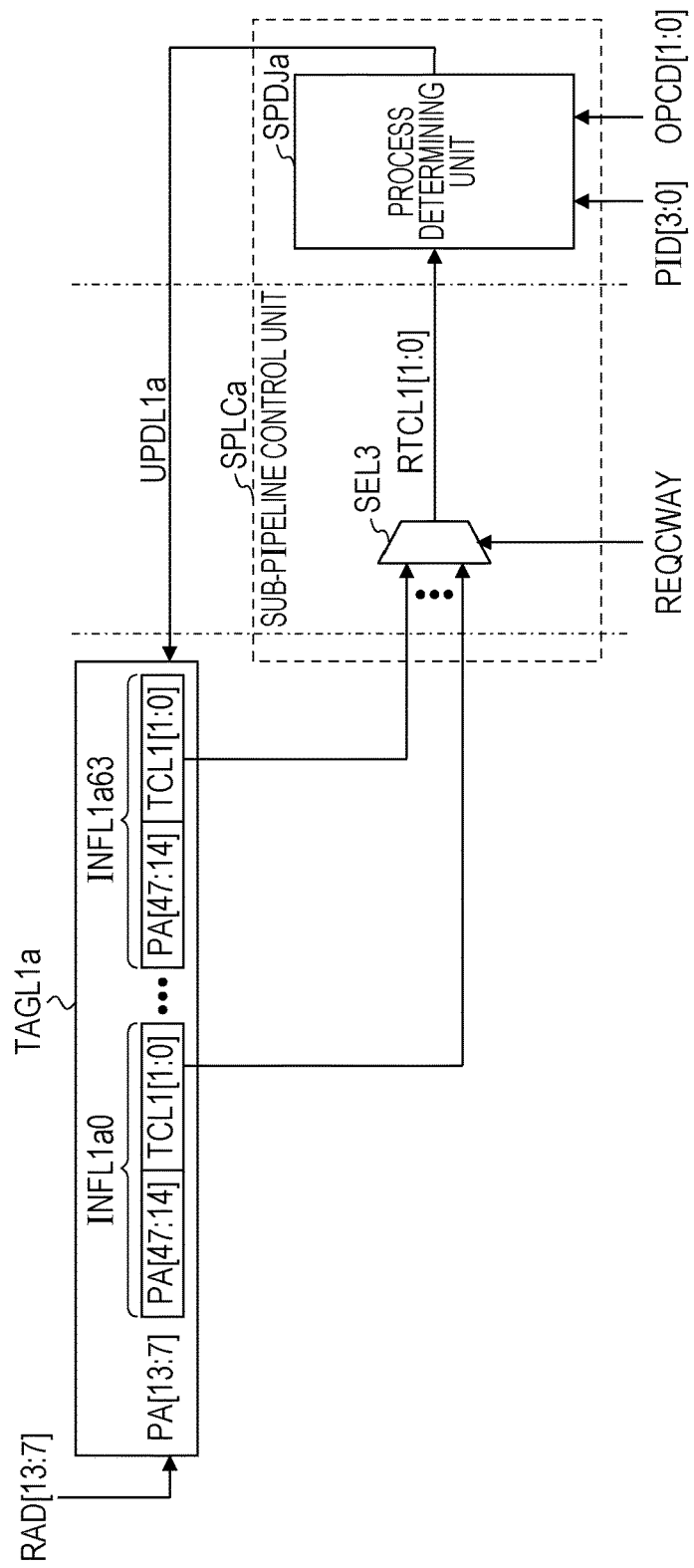
FIG. 25 is a diagram illustrating one example of a sub-pipeline control unit illustrated in FIG. 22.

FIG. 25 is a diagram illustrating one example of the sub-pipeline control unit SPLCa illustrated in FIG. 22. Dot-dashed lines illustrated in FIG. 25 correspond to boundaries between each stage of a pipeline process. The sub-pipeline control unit SPLCa includes the selecting unit SEL3 and a process determining unit SPDJa.

The selecting unit SEL3 is the same as or corresponds to the selecting unit SEL3 illustrated in FIG. 10. For example, the selecting unit SEL3 selects, as the requested data information RTCL1[1:0], the type code TCL1[1:0], of a plurality of type codes TCL1[1:0] received from the management information retaining unit TAGL1a, that is specified by the requested way information REQCWAY. The selecting unit SEL3 outputs the requested data information RTCL1[1:0] to the process determining unit SPDJa.

The process determining unit SPDJa receives the requested data information RTCL1[1:0] from the selecting unit SEL3 and receives the process information PID[3:0] and the operation information OPCD[1:0] from the input unit INP. The process determining unit SPDJa updates the first management information INFL1a retained in the management information retaining unit TAGL1a based on the requested data information RTCL1[1:0], the process information PID[3:0], and the operation information OPCD[1:0]. For example, the process determining unit SPDJa outputs the update instruction UPDL1a to the management information retaining unit TAGL1a.

The embodiment heretofore illustrated in FIG. 22 to FIG. 25 may achieve the same effect as the embodiment illustrated in FIG. 1 and FIG. 2. For example, the second cache memory LL may perform a process based on the first type process request (for example, completion of the replacement that does not accompany a write-back) in parallel with a process based on the second type process request such as a read request. Accordingly, the throughput of the second cache memory LL may be improved while an increase in the circuit size is reduced, compared with a technique that may not perform a process based on the first type process request in parallel with a process based on the second type process request (for example, the comparative example illustrated in FIG. 21).

Figure 26:
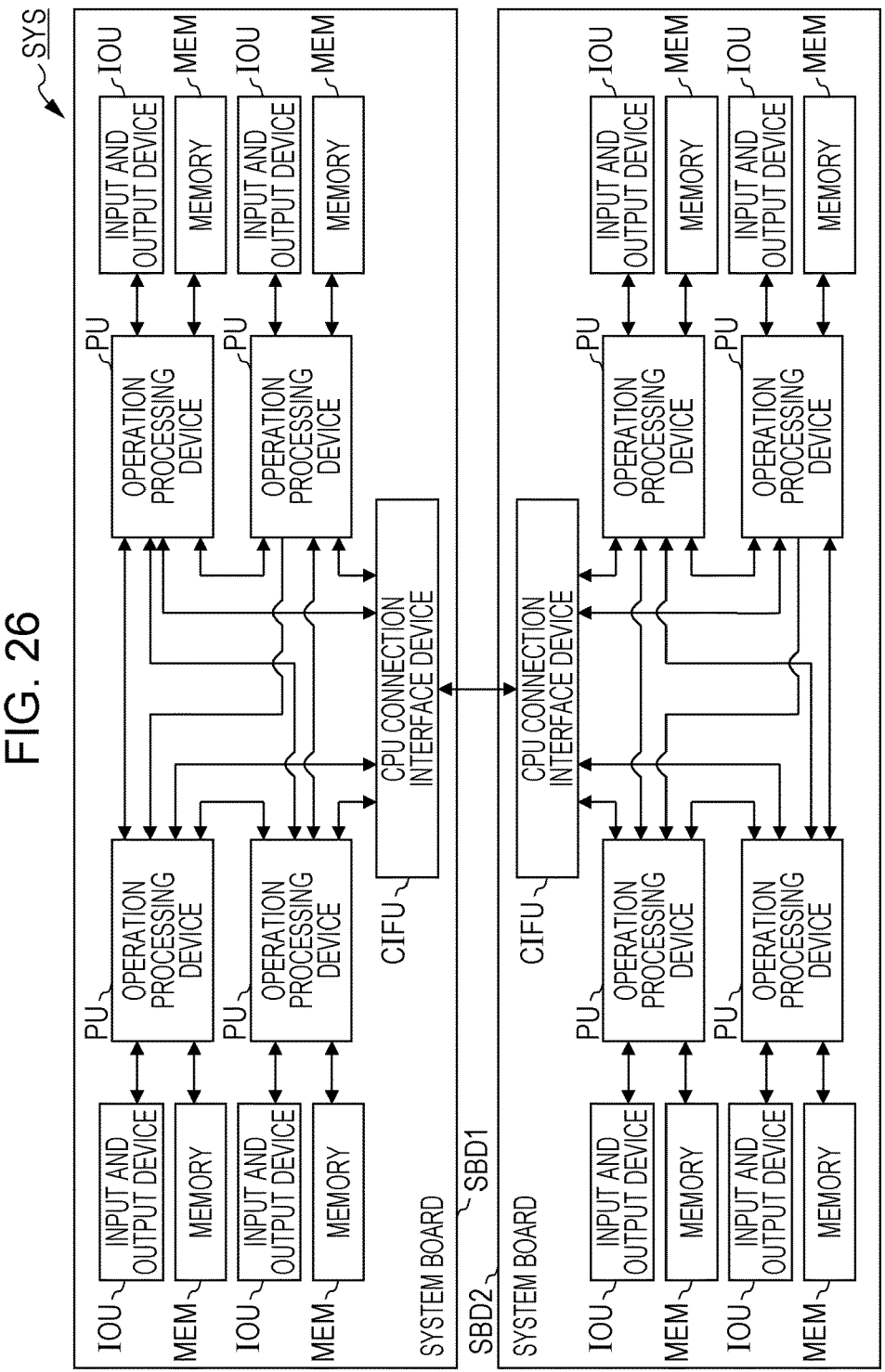
FIG. 26 is a diagram illustrating one example of a system equipped with the operation processing device illustrated in FIG. 3 and FIG. 22.

FIG. 26 illustrates one example of a system equipped with the operation processing device PU illustrated in FIG. 3 and FIG. 22. A system SYS is an information processing apparatus such as a server. The system SYS includes a plurality of system boards SBD (SBD1 and SBD2). The system boards SBD1 and SBD2 have the same or corresponding configuration.

Each system board SBD includes a plurality of the operation processing devices PU, a plurality of input and output devices IOU that is respectively connected to the plurality of operation processing devices PU, a plurality of memories MEM that is respectively connected to the plurality of operation processing devices PU, and a CPU connection interface device CIFU.

The plurality of operation processing devices PU (the operation processing device PU illustrated in FIG. 3 or FIG. 22) is connected to each other through the CPU interface unit CIF in each operation processing device PU. The plurality of operation processing devices PU (more specifically, the CPU interface units CIF in the operation processing devices PU) is connected to the CPU connection interface device CIFU. The CPU connection interface device CIFU of the system board SBD1 and the CPU connection interface device CIFU of the system board SBD2 are connected to each other.

The input and output device IOU includes an input device such as a keyboard for input of data into the operation processing device PU and an output device such as a display that outputs a process result of the operation processing device PU, and is connected to the input and output control unit IOCNTL in the operation processing device PU. The memory MEM is, for example, a main memory device of a lower level than the second cache memory LL and is connected to the main memory control unit MCNTL in the operation processing device PU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An operation processing device comprising:
   a plurality of processors that executes instructions;
   a plurality of first cache memories that is provided in correspondence with the plurality of processors and retains data; and
   a second cache memory that is shared by the plurality of processors and is coupled to the plurality of first cache memories,
   wherein the second cache memory includes
   a data retaining unit that retains data,
   a first information retaining unit that retains first management information for management of data retained in the plurality of first cache memories,
   a second information retaining unit that retains second management information for management of data retained in the data retaining unit,
   a classifying unit that classifies a request for a process, of
   a plurality of process requests including a read request from any of the plurality of first cache memories, performed by referencing the first management information and not referencing the second management information as a first type process request and classifies a request for a process performed by referencing the second management information as a second type process request,
   a second processing unit that references the second management information to perform a process which is based on the second type process request received from the classifying unit, and
   a first processing unit that references the first management information and does not reference the second management information to perform a process which is based on the first type process request received from the classifying unit, and is operable in parallel with the second processing unit.

2. The operation processing device according to claim 1, wherein the classifying unit classifies a request for a process, of processes that evict data from any of the plurality of first cache memories, not accompanying a write-back that writes back the evicted data to the second cache memory as the first type process request.

3. The operation processing device according to claim 1, wherein the data retaining unit includes a plurality of ways retaining data for each second index that is represented by a bit group corresponding to a part of a memory address used for data access,
   the second cache memory further includes a selection information retaining unit that retains selection information for selection of a way, of the plurality of ways, having a longest wait time in which the way is not accessed by any of the plurality of first cache memories,
   the second processing unit further includes a possession information generating unit that generates, based on the first management information, possession information which indicates a way retaining data, of data specified by the same second index as access target data and retained in each of the plurality of ways, retained in any of the plurality of first cache memories, and
   the second cache memory includes a selecting unit that selects, based on the selection information, a way retaining data evicted from the second cache memory in a prioritized manner from the ways of the plurality of ways other than the way indicated by the possession information.

4. The operation processing device according to claim 3, wherein the first information retaining unit retains the first management information corresponding to each of the plurality of first cache memories for each first index that is represented by a bit group corresponding to a part of the second index,
   the first management information includes way information that indicates any of the plurality of ways, difference information that indicates a difference between the first index and the second index, and a type code that indicates a state of data, and
   the possession information generating unit includes
   a decoding unit that for each first index decodes a logical value indicated by the way information and generates decoded information which includes bits indicating truth or falsity for each of the plurality of ways,
   a state determining unit that for each first index determines whether or not data is valid based on the type code,
   a match determining unit that for each first index determines whether or not partial information, of the memory address of the access target data, corresponding to the difference information matches the difference information,
   a logical product unit that for each first index performs an operation to calculate a logical product of each bit of the decoded information, a determination result of the state determining unit, and a determination result of the match determining unit, and a logical sum unit that for each first index performs an operation to calculate a logical sum of operation results of the logical product unit corresponding to each of the plurality of first cache memories and outputs an operation result as the possession information to the selecting unit.

5. A method for controlling an operation processing device including a plurality of processors that executes instructions, a plurality of first cache memories that is provided in correspondence with the plurality of processors and retains data, and a second cache memory that is shared by the plurality of processors and coupled to the plurality of first cache memories and includes a data retaining unit which retains data, a first information retaining unit which retains first management information for management of data retained in the plurality of first cache memories, and a second information retaining unit which retains second management information for management of data retained in the data retaining unit, the method comprising:

causing a classifying unit included in the second cache memory to classify a request for a process, of a plurality of process requests including a read request from any of the plurality of first cache memories, performed by referencing the first management information and not referencing the second management information as a first type process request and classifying a request for a process performed by referencing the second management information as a second type process request;

causing a second processing unit included in the second cache memory to reference the second management information to perform a process that is based on the second type process request received from the classifying unit; and causing a first processing unit included in the second cache memory to reference the first management information and not to reference the second management information to perform a process that is based on the first type process request received from the classifying unit in parallel with a process that is based on the second type process request.

* * * * *